United States Patent
Manolakos et al.

(10) Patent No.: US 12,250,581 B2
(45) Date of Patent: *Mar. 11, 2025

(54) ROUND TRIP TIME (RTT) POSITIONING AND TIMING ADVANCE (TA) COMMAND WITH USER EQUIPMENT RX TX MEASUREMENT REPORTING

(71) Applicant: QUALCOMM Incorporated, San Diego, CA (US)

(72) Inventors: Alexandros Manolakos, Escondido, CA (US); Sven Fischer, Nuremberg (DE); Jay Kumar Sundararajan, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

This patent is subject to a terminal disclaimer.

(21) Appl. No.: 17/721,972

(22) Filed: Apr. 15, 2022

(65) Prior Publication Data

US 2022/0248249 A1 Aug. 4, 2022

Related U.S. Application Data

(63) Continuation of application No. 16/739,055, filed on Jan. 9, 2020, now Pat. No. 11,323,907.

(30) Foreign Application Priority Data

Jan. 11, 2019 (GR) ............................ 20190100023

(51) Int. Cl.
*H04W 24/10* (2009.01)
*H04W 56/00* (2009.01)
*H04W 64/00* (2009.01)

(52) U.S. Cl.
CPC ....... *H04W 24/10* (2013.01); *H04W 56/0045* (2013.01); *H04W 64/00* (2013.01)

(58) Field of Classification Search
CPC . H04W 24/10; H04W 56/0045; H04W 64/00; H04W 4/02; H04W 4/027;
(Continued)

(56) References Cited

U.S. PATENT DOCUMENTS 10,736,103 B2* 8/2020 Kim .................. H04W 4/06
2012/0120821 A1* 5/2012 Kazmi ............. H04W 56/0045
370/336

(Continued)

FOREIGN PATENT DOCUMENTS

CN 106664591 A 5/2017
CN 108370549 A 8/2018
(Continued)

OTHER PUBLICATIONS

Qualcomm, R2-1817899, 3GPP TSG-RAN WG2 Meeting #104, pp. 1-18, Nov. 12-16, 2018 (Year: 2018).*

(Continued)

*Primary Examiner* — Nguyen H Ngo
(74) *Attorney, Agent, or Firm* — Muncy, Geissler, Olds & Low, P.C.

(57) ABSTRACT

Disclosed are techniques for addressing relation round trip time (RTT) positioning and timing advance (TA) command with user equipment (UE) receive-transmit (Rx-Tx) measurement reporting in wireless network such as in new radio (NR).

48 Claims, 15 Drawing Sheets

(58) Field of Classification Search
CPC ......... H04W 4/14; H04W 4/80; H04W 4/023;
H04W 4/70; H04W 72/1215; H04W
56/0005; H04W 28/04; H04W 74/02;
H04W 88/06; H04W 56/001; H04W
28/0278; H04W 72/02; H04W 72/0413;
H04W 72/048; H04W 72/14; H04W
74/004; H04W 76/11; H04W 76/18;
H04W 76/27; H04W 74/0833; H04W
24/02; H04W 88/085; H04W 76/10;
H04L 5/0048; H04L 5/0057; H04L 5/001;
H04L 1/1896; H04L 5/0092; H04L
5/0051; H04L 5/0053; H04L 27/2602;
H04L 5/0082; H04L 5/0091; H04L
5/0032; H04L 5/0023; G01S 5/0205;
G01S 5/0263; G01S 5/14; H04B 7/0617;
H04J 11/0069
See application file for complete search history.

(56) References Cited

U.S. PATENT DOCUMENTS

| | | | | |
|---|---|---|---|---|
| 2013/0286987 | A1* | 10/2013 | Dinan | H04L 27/2613 |
| | | | | 370/329 |
| 2014/0226640 | A1* | 8/2014 | Zhu | H04L 5/0028 |
| | | | | 370/336 |
| 2018/0145798 | A1* | 5/2018 | Suzuki | H04L 43/0864 |
| 2019/0059063 | A1* | 2/2019 | Zhang | H04W 56/0045 |
| 2020/0229016 | A1 | 7/2020 | Manolakos et al. | |

FOREIGN PATENT DOCUMENTS

| | | |
|---|---|---|
| EP | 3425969 A1 | 1/2019 |
| WO | 2017181384 A1 | 10/2017 |

OTHER PUBLICATIONS

"3rd Generation Partnership Project; Technical Specification Group Radio Access Network; Evolved Universal Terrestrial Radio Access (E-UTRA); Requirements for support of radio resource management (Release 15)", 3GPP Standard, Technical Specification, 3GPP TS 36.133, 3rd Generation Partnership Project (3GPP), Mobile Competence Centre, 650, Route Des Lucioles, F-06921 Sophia-Antipolis Cedex, France, vol. RAN WG4, No. V15.4.0, Oct. 3, 2018 (Oct. 3, 2018), XP051487561, pp. 82-710, 342-348, [retrieved on Oct. 3, 2018], paragraph [8.1.2.7.1].

International Preliminary Report on Patentability—PCT/US2020/013235, the International Bureau of WIPO—Geneva, Switzerland, Jul. 22, 2021.

International Search Report and Written Opinion—PCT/US2020/013235—ISA/EPO—Apr. 21, 2020.

Qualcomm Incorporated: "Combined Downlink and Uplink NR Positioning Procedures", 3GPP Draft, 3GPP TSG-RAN WG2 Meeting #104, R2-1817899_(Positioning Procedures), 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481785, pp. 1-18, Retrieved from the Internet: URL: https://www.3gpp.org/ftp/tsg_ran/wg2_rl2/TSGR2_104/Docs/R2-1817899.zip, https://www.3gpp.org/ftp/tsg_ran/wg2_rl2/TSGR2_104/Docs/R2-1817899.zip [retrieved on Nov. 2, 2018], Paragraphs [001]-[004], p. 4, Figures 1-5, figure 4.

Taiwan Search Report—TW109100998—TIPO—Apr. 28,2023.

* cited by examiner

ROUND TRIP TIME (RTT) POSITIONING AND TIMING ADVANCE (TA) COMMAND WITH USER EQUIPMENT RX TX MEASUREMENT REPORTING

CROSS-REFERENCE TO RELATED APPLICATIONS

The present Application for Patent is a continuation of U.S. patent application Ser. No. 16/739,055, entitled "ROUND TRIP TIME (RTT) POSITIONING AND TIMING ADVANCE (TA) COMMAND WITH USER EQUIPMENT RX TX MEASUREMENT," filed Jan. 9 2020, which claims priority to Greek Patent Application No. 20190100023, entitled "RELATION OF RTT POSITIONING AND TIMING ADVANCE (TA) COMMAND WITH UE RX-TX MEASUREMENT REPORTING", filed Jan. 11, 2019, each of which is assigned to the assignee hereof, and expressly incorporated herein by reference in its entirety.

INTRODUCTION

1. Technical Field

Various aspects described herein generally relate to wireless communication systems, and more particularly, to relation of round trip time (RTT) positioning and timing advance (TA) command with user equipment (UE) Rx-Tx measurement reporting in wireless networks, e.g., in new radio (NR).).

2. Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device can also be configured to report the time of arrival (ToA) of RF signals.

With OTDOA, when the mobile device reports the time difference of arrival (TDOA) between RF signals from two network nodes, the location of the mobile device is then known to lie on a hyperbola with the locations of the two network nodes as the foci. Measuring TDOAs between multiple pairs of network nodes allows for solving for the mobile device's position as intersections of the hyperbolas.

Round trip time (RTT) is another technique for determining a position of a mobile device. RTT is a two-way messaging technique (network node to mobile device and mobile device to network node), with both the mobile device and the network node reporting their receive-to-transmit (Rx-Tx) time differences to a positioning entity, such as a location server or location management function (LMF), that computes the mobile device's position. This allows for computing the back-and-forth flight time between the mobile device and the network node. The location of the mobile device is then known to lie on a circle with a center at the network node's position. Using RTTs with multiple network nodes allows solving for the mobile device's position as the intersections of the circles.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In accordance with the various aspects disclosed herein, at least one aspect includes, a method performed by a serving transmission reception point (TRP), the method including: sending, to a user equipment (UE) being served by the serving TRP, a measurement request; sending, to the UE, a plurality of downlink reference signal (DL RS) configurations corresponding to reference signals transmitted by the serving and/or neighboring TRPs in a frame including a plurality of slots and subframes, each DL RS being carried on a slot of the frame; sending, to the UE, a plurality of uplink reference signal (UL RS) configurations corresponding to UL RSs to be transmitted by the UE towards the serving or neighboring TRP in the frame, each UL RS being carried on a slot of the frame; transmitting, to the UE, one or more timing advance (TA) commands in the frame, each TA command being carried on a slot of the frame; and receiving, from the UE, a measurement report of the frame on an uplink channel, where the measurement report includes: a time-stamp; and one or more UE round trip time (RTT) related measurements, each UE RTT related measurement representing a duration between the UE receiving the DL RS from the transmitting TRP and the UE transmitting the UL RS in this frame, and where the time-stamp is one of a system frame number (SFN), subframe ID, slot ID, or any combination thereof.

In accordance with the various aspects disclosed herein, at least one aspect includes, a method performed by a UE, the method including: receiving, from a serving TRP servicing the UE, a measurement request; receiving, from the serving TRP, a plurality of DL RS configurations corresponding to reference signals transmitted by the serving and/or neighboring TRPs in a frame including a plurality of slots and subframes, each DL RS being carried on a slot of the frame; receiving, from the serving TRP, a plurality of UL RSs configurations corresponding to reference signals to be transmitted by the UE towards the serving or neighboring TRP in the frame, each UL RS being carried on a slot of the frame; receiving, from the serving TRP, one or more TA commands in the frame, each TA command being carried on a slot of the frame; determining an application of the timing advance in accordance with the TA commands; and providing, to the serving TRP, a measurement report of the frame, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

In accordance with the various aspects disclosed herein, at least one aspect includes, a serving TRP, including: a transceiver; a memory; and a processor, where the transceiver, the memory, and the processor are configured to: send, to a UE being served by the serving TRP, a measurement request; send to the UE, a plurality of DL RS configurations corresponding to reference signals transmitted by the serving and/or neighboring TRPs in a frame including a plurality of slots and subframes, each DL RS being carried on a slot of the frame; send to the UE, a plurality of UL RS configurations corresponding to UL RSs to be transmitted by the UE towards the serving or neighboring TRP in the frame, each UL RS being carried on a slot of the frame; transmit, to the UE, one or more TA commands in the frame, each TA command being carried on a slot of the frame; and receive, from the UE, a measurement report of the frame on an uplink channel, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

In accordance with the various aspects disclosed herein, at least one aspect includes, a UE, including: a transceiver; a memory; and a processor, where the transceiver, the memory, and the processor are configured to: receive, from a serving TRP servicing the UE, a measurement request; receive, from the serving TRP, a plurality of DL RS configurations corresponding to reference signals transmitted by the serving and/or neighboring TRPs in a frame including a plurality of slots and subframes, each DL RS being carried on a slot of the frame; receive, from the serving TRP, a plurality of UL RSs configurations corresponding to reference signals to be transmitted by the UE towards the serving or neighboring TRP in the frame, each UL RS being carried on a slot of the frame; receive, from the serving TRP, one or more TA commands in the frame, each TA command being carried on a slot of the frame; determine an application of the timing advance in accordance with the TA commands; and provide, to the serving TRP, a measurement report of the frame, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

In accordance with the various aspects disclosed herein, at least one aspect includes, a serving TRP, including: means for sending, to a UE being served by the serving TRP, a measurement request; means for sending, to the UE, a plurality of DL RS configurations corresponding to reference signals transmitted by the serving and/or neighboring TRPs in a frame including a plurality of slots and subframes, each DL RS being carried on a slot of the frame; means for sending, to the UE, a plurality of UL RS configurations corresponding to UL RSs to be transmitted by the UE towards the serving or neighboring TRP in the frame, each UL RS being carried on a slot of the frame; means for transmitting, to the UE, one or more TA commands in the frame, each TA command being carried on a slot of the frame; and means for receiving, from the UE, a measurement report of the frame on an uplink channel, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

In accordance with the various aspects disclosed herein, at least one aspect includes, a UE, including: means for receiving, from a serving TRP servicing the UE, a measurement request; means for receiving, from the serving TRP, a plurality of DL RS configurations corresponding to reference signals transmitted by the serving and/or neighboring TRPs in a frame including a plurality of slots and subframes, each DL RS being carried on a slot of the frame; means for receiving, from the serving TRP, a plurality of UL RSs configurations corresponding to reference signals to be transmitted by the UE towards the serving or neighboring TRP in the frame, each UL RS being carried on a slot of the frame; means for receiving, from the serving TRP, one or more TA commands in the frame, each TA command being carried on a slot of the frame; means for determining an application of the timing advance in accordance with the TA commands; and means for providing, to the serving TRP, a measurement report of the frame, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

In accordance with the various aspects disclosed herein, at least one aspect includes, a non-transitory computer-readable medium storing computer-executable instructions for a serving TRP, the computer-executable instructions including: one or more instructions causing the serving TRP to send, to a UE being served by the serving TRP, a measurement request; one or more instructions causing the serving TRP to send to the UE, a plurality of DL RS configurations corresponding to reference signals transmitted by the serving and/or neighboring TRPs in a frame including a plurality of slots and subframes, each DL RS being carried on a slot of the frame; one or more instructions causing the serving TRP to send to the UE, a plurality of UL RS configurations corresponding to UL RSs to be transmitted by the UE towards the serving or neighboring TRP in the frame, each UL RS being carried on a slot of the frame; one or more instructions causing the serving TRP to transmit, to the UE, one or more TA commands in the frame, each TA command being carried on a slot of the frame; and one or more instructions causing the serving TRP to receive, from the UE, a measurement report of the frame on an uplink channel, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

In accordance with the various aspects disclosed herein, at least one aspect includes, a non-transitory computer-readable medium storing computer-executable instructions for a UE, the computer-executable instructions including: one or more instructions causing the UE to receive, from a serving TRP servicing the UE, a measurement request; one or more instructions causing the UE to receive, from the serving TRP, a plurality of DL RS configurations corresponding to reference signals transmitted by the serving and/or neighboring TRPs in a frame including a plurality of slots and subframes, each DL RS being carried on a slot of the frame; one or more instructions causing the UE to receive, from the serving TRP, a plurality of UL RSs configurations corresponding to reference signals to be transmitted by the UE towards the serving or neighboring TRP in the frame, each UL RS being carried on a slot of the frame; one or more instructions causing the UE to receive, from the serving TRP, one or more TA commands in the frame, each TA command being carried on a slot of the frame; one or more instructions causing the UE to determine an application of the timing advance in accordance with the TA commands; and one or more instructions causing the UE to provide, to the serving TRP, a measurement report of the frame, where the measurement report includes: a time-stamp; and one or more UE RTT related measurements, each UE RTT related measurement representing a duration between the UE receiving the DL RS from the transmitting TRP and the UE transmitting the UL RS in this frame, and where the time-stamp is one of an SFN, subframe ID, slot ID, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
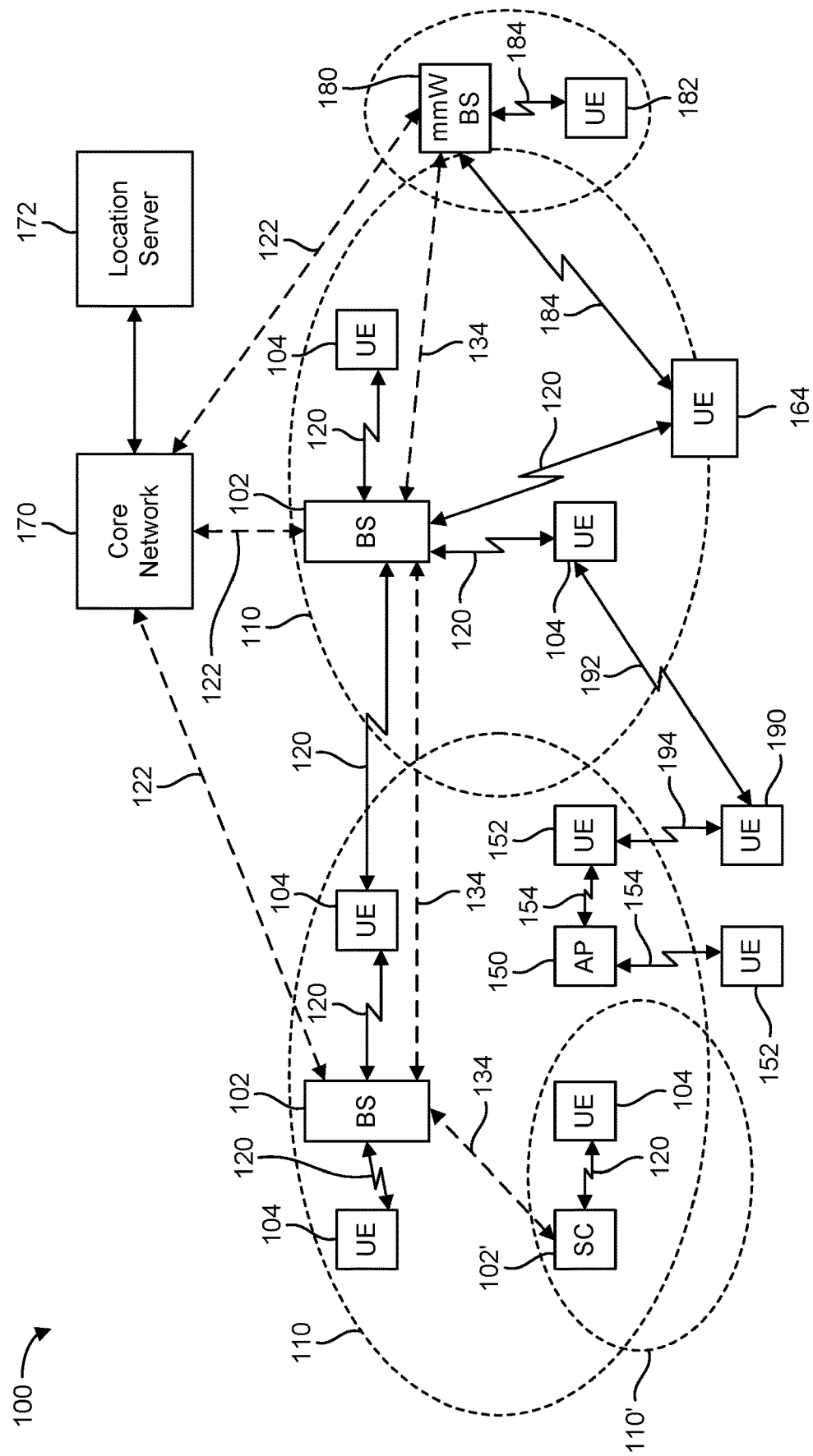
FIG. 1 illustrates an exemplary wireless communications system in accordance with one or more aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction.

Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
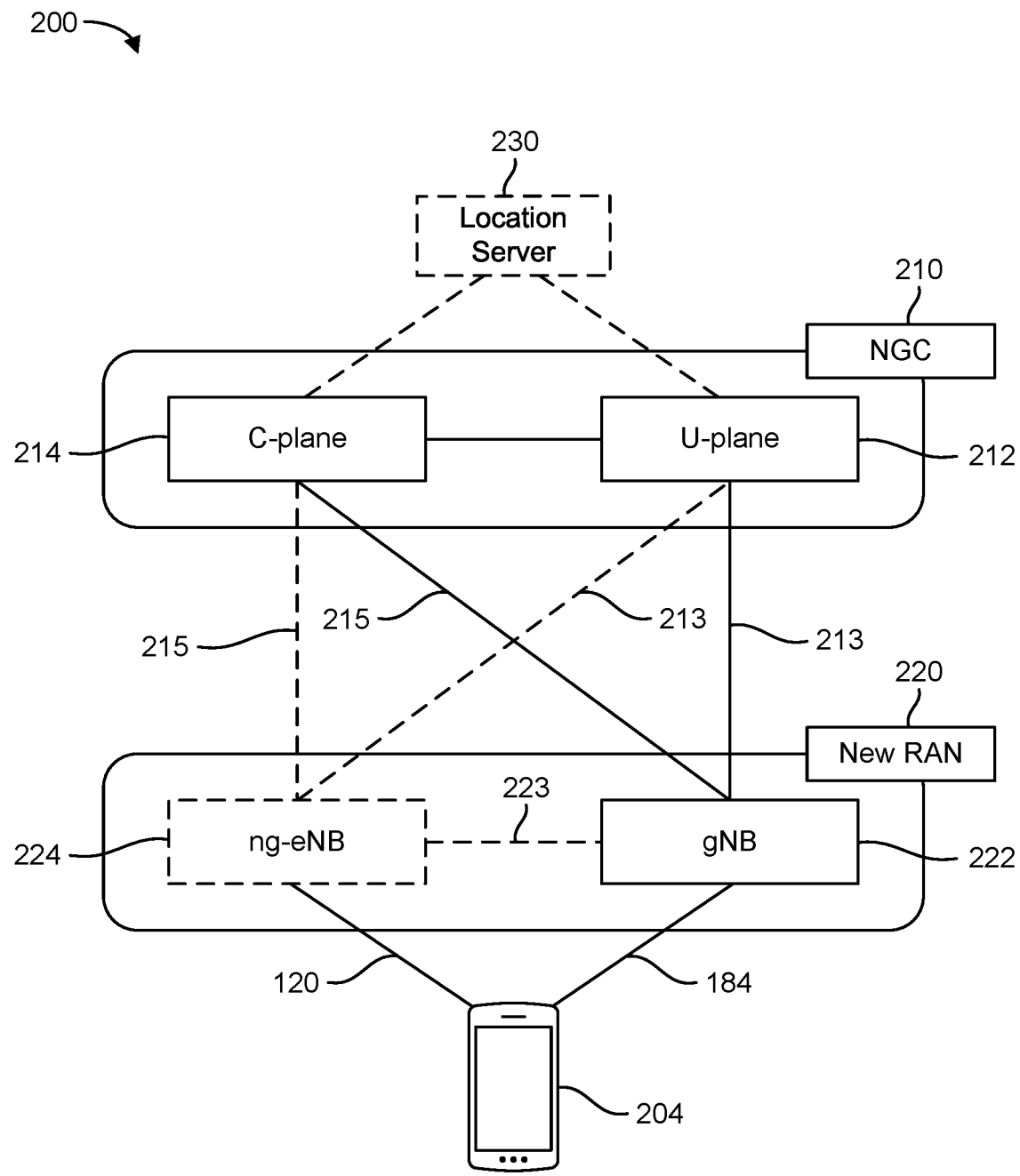
FIGS. 2A and 2B illustrate example wireless network structures in accordance with one or more aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
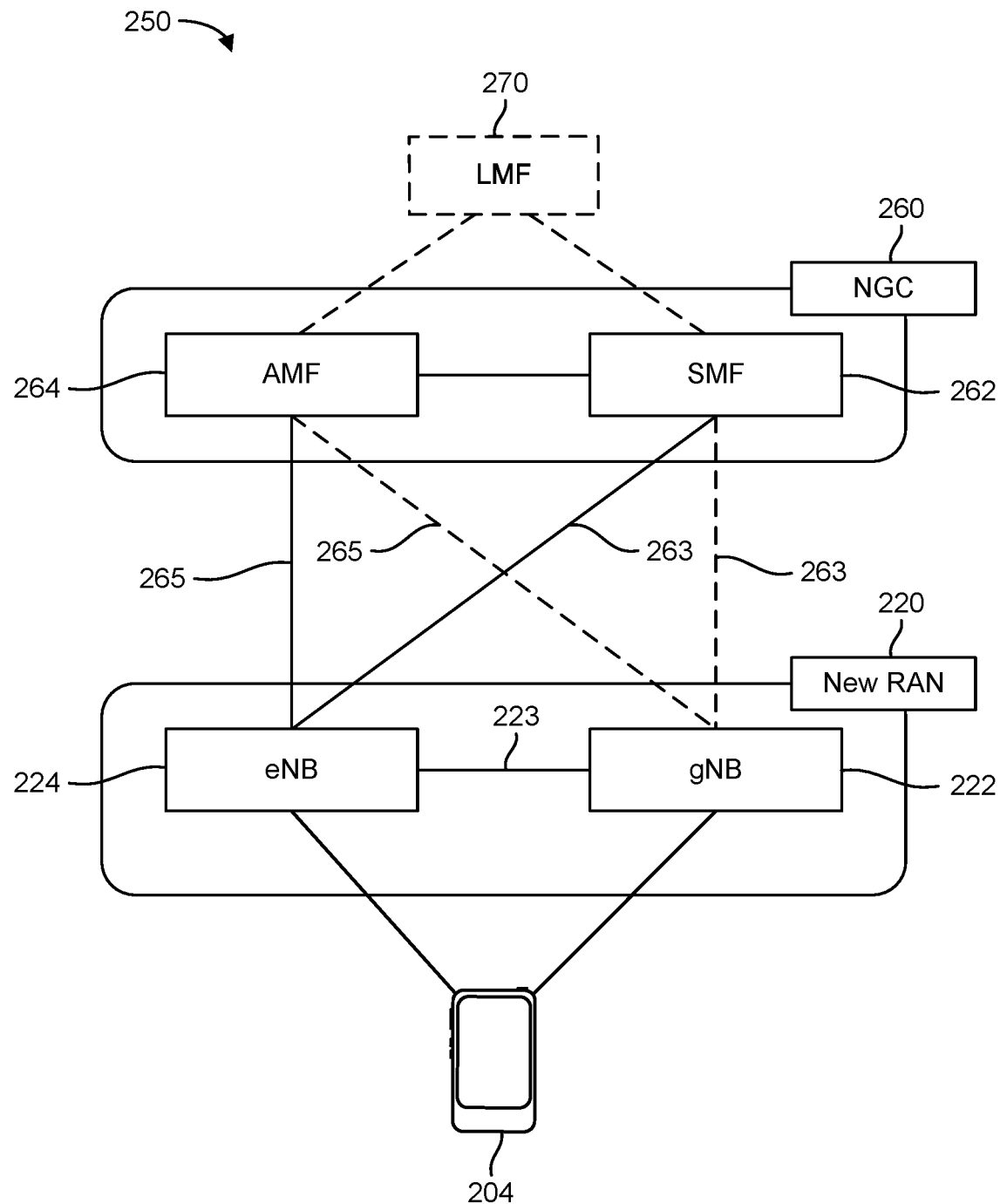

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
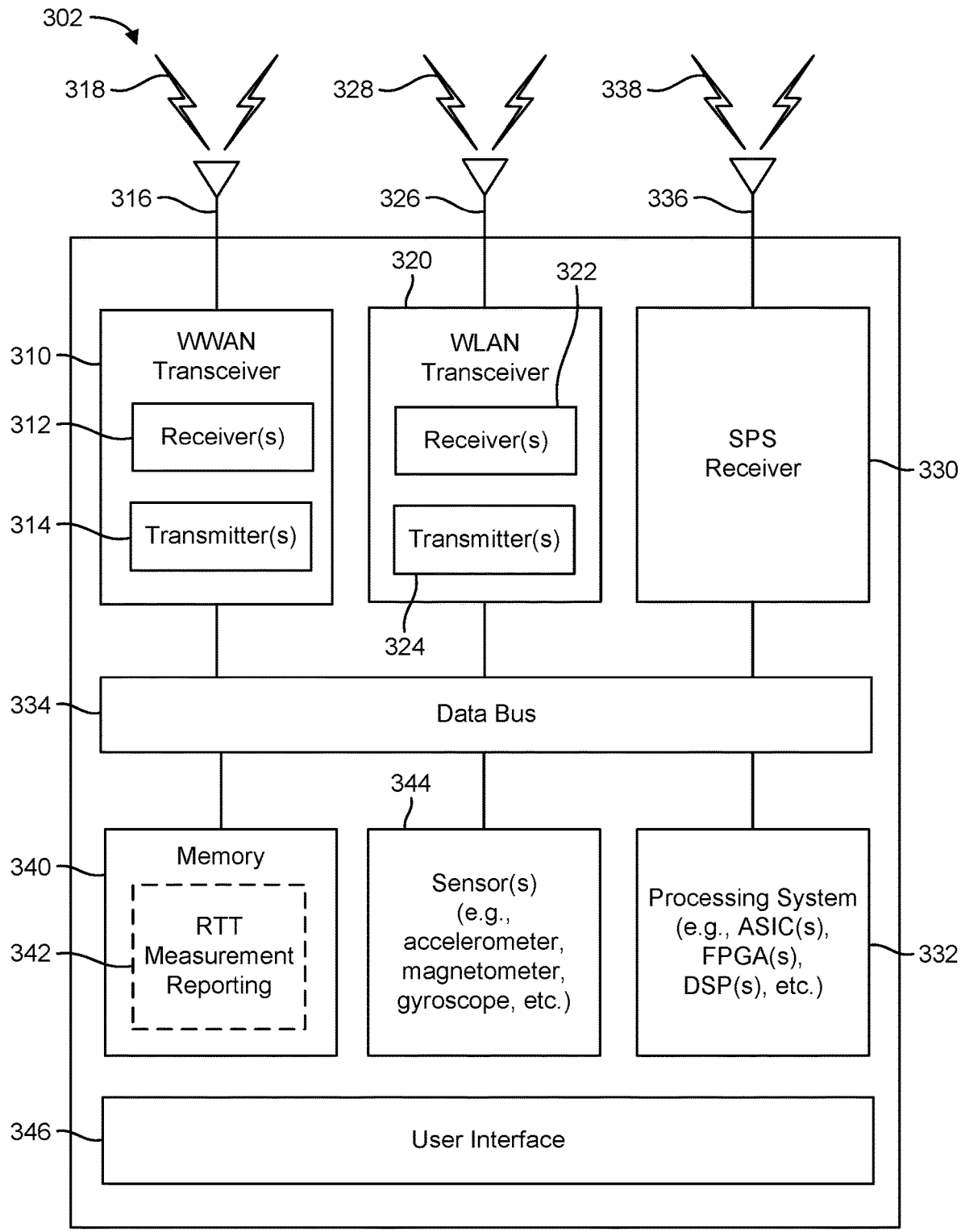
FIGS. 3A to 3C are simplified block diagrams of several sample aspects of components that may be employed in wireless communication nodes and configured to support communication in accordance with one or more aspects of the disclosure.
Figure 3B:
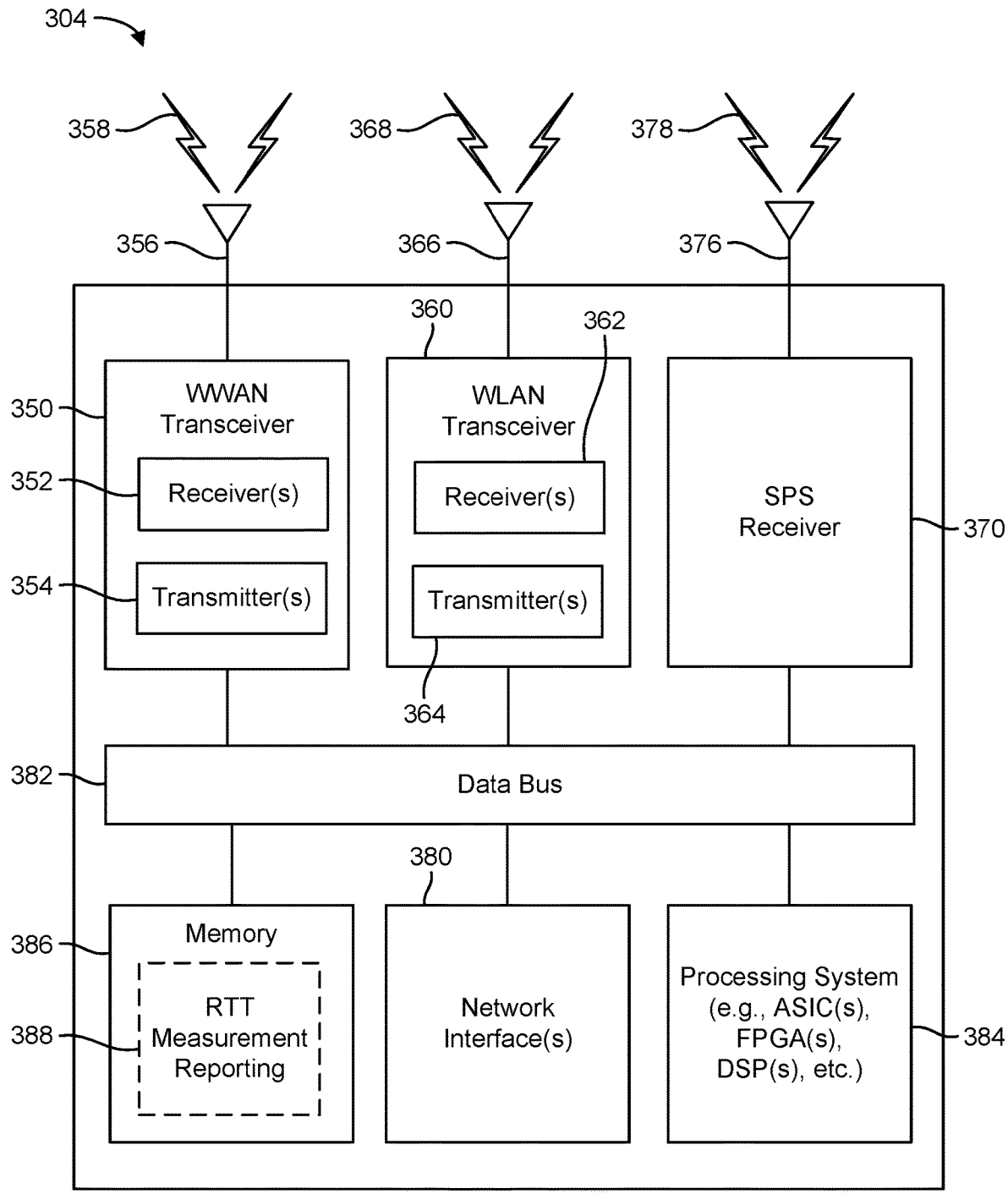
Figure 3C:
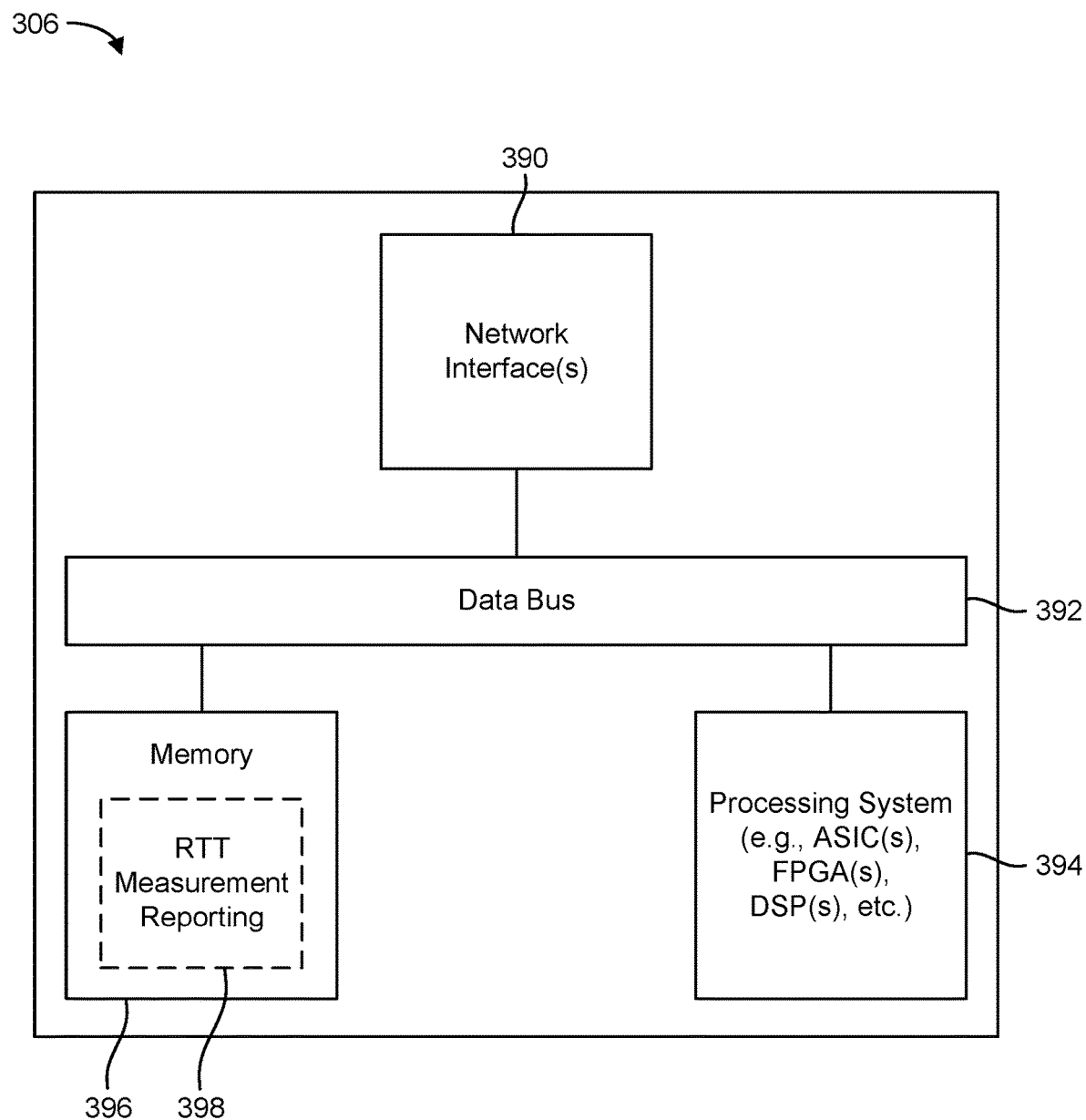

FIGS. 3A, 3B, and 3C illustrate several sample components (represented by corresponding blocks) that may be incorporated into a UE 302 (which may correspond to any of the UEs described herein), a TRP 304 (which may correspond to any of the base stations, gNBs, eNBs, cells, etc. described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the TRP 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the TRP 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The TRP 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The apparatuses 302, 304, and 306 also include other components that may be used in conjunction with the operations as disclosed herein. The UE 302 includes processor circuitry implementing a processing system 332 for providing functionality relating to, for example, sounding reference signals (SRS) transmissions as disclosed herein, and for providing other processing functionality. The TRP 304 includes a processing system 384 for providing functionality relating to, for example, SRS configuration and reception as disclosed herein, and for providing other processing functionality. The network entity 306 includes a processing system 394 for providing functionality relating to, for example, SRS configuration as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include RTT measurement reporting components 342, 388, and 398, respectively. The RTT measurement reporting components 342, 388, and 398 may be hardware circuits that are part of or coupled to the processing systems 332, 384, and 394, respectively, that, when executed, cause the apparatuses 302, 304, and 306 to perform the functionality described herein. Alternatively, the RTT measurement reporting components 342, 388, and 398 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TRP 304. These soft decisions may be based on channel estimates computed by a channel estimator. The soft decisions are then decoded and de-interleaved to recover the data and control signals that were originally transmitted by the TRP 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the TRP 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the TRP 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the TRP 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the TRP 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RTT measurement reporting modules 342, 388, and 398, etc.

Figure 4:
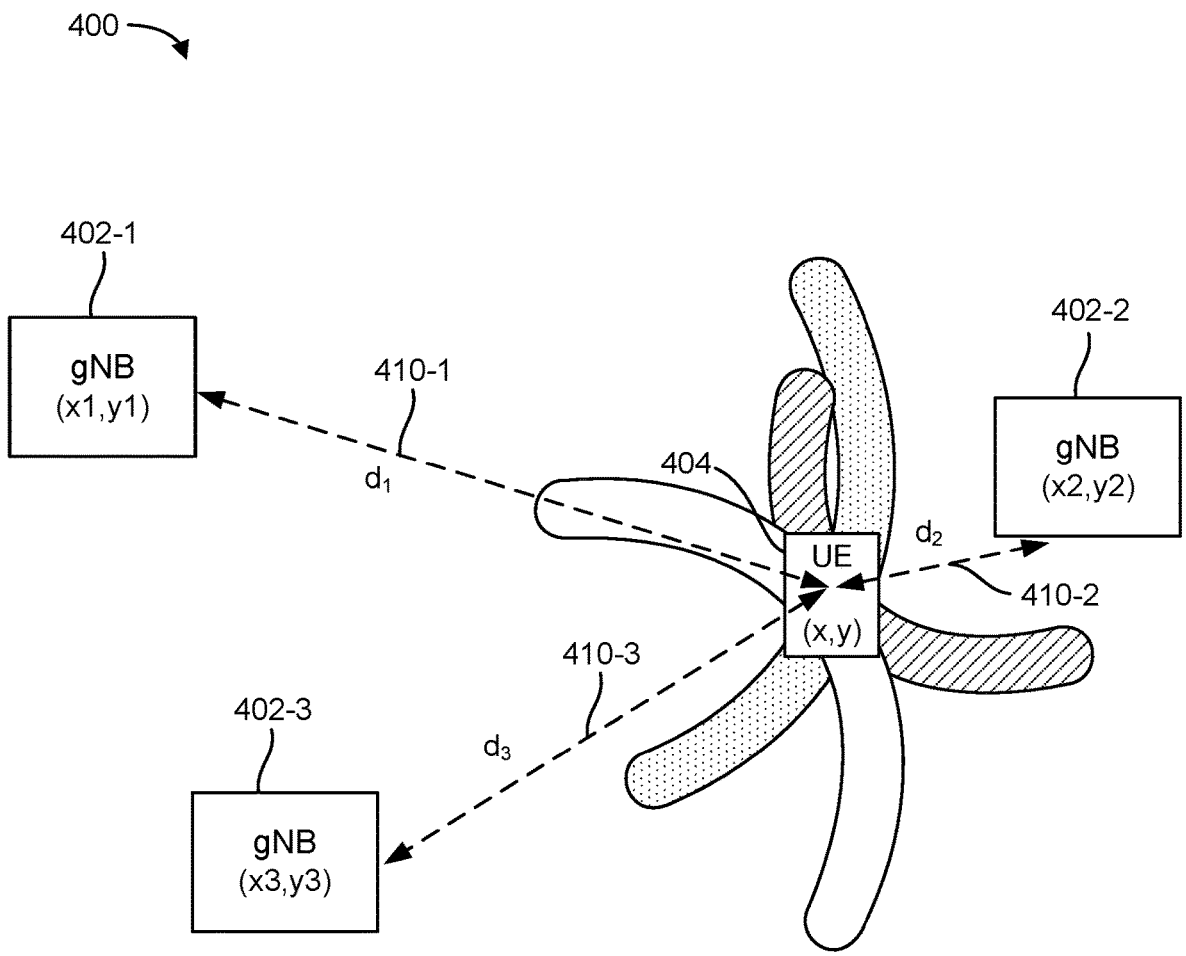
FIG. 4 illustrates a scenario for determining a position of a UE through a multi-RTT procedure in accordance with one or more aspects of the disclosure.

FIG. 4 illustrates an exemplary wireless communications system 400 according to aspects of the disclosure. In the example of FIG. 4, a UE 404 (which may correspond to any of the UEs described herein) is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402-1, 402-2, and 402-3 (collectively, base stations 402, and which may correspond to any of the base stations described herein) using RF signals and standardized protocols for the modulation of the RF signals and the exchange of information packets. By extracting different types of information from the exchanged RF signals, and utilizing the layout of the wireless communications system 400 (i.e., the base stations' locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and three base stations 402, as will be appreciated, there may be more UEs 404 and more base stations 402.

To support position estimates, the base stations 402 may be configured to broadcast reference RF signals (e.g., PRS, NRS, CRS, TRS, CSI-RS, PSS, or SSS, etc.) to UEs 404 in their coverage area to enable a UE 404 to measure characteristics of such reference RF signals. For example, the UE 404 may measure the time of arrival (ToA) of specific reference RF signals (e.g., PRS, NRS, CRS, CSI-RS, etc.) transmitted by at least three different base stations 402-1, 402-2, and 402-3 and may use the RTT positioning method to report these ToAs (and additional information) back to the serving base station 402 or another positioning entity (e.g., location server 230, LMF 270).

In an aspect, although described as the UE 404 measuring reference RF signals from a base station 402, the UE 404 may measure reference RF signals from one of multiple TRPs supported by a base station 402. Where the UE 404 measures reference RF signals transmitted by a TRP supported by a base station 402, the at least two other reference RF signals measured by the UE 404 to perform the RTT procedure would be from TRPs supported by base stations 402 different from the first base station 402 and may have good or poor signal strength at the UE 404.

In order to determine the position (x, y) of the UE 404, the entity determining the position of the UE 404 needs to know the locations of the base stations 402, which may be represented in a reference coordinate system as $(x_k, y_k)$, where k=1, 2, 3 in the example of FIG. 4. Where one of the base stations 402 (e.g., the serving base station) or the UE 404 determines the position of the UE 404, the locations of the involved base stations 402 may be provided to the serving base station 402 or the UE 404 by a location server with knowledge of the network geometry (e.g., location server 230, LMF 270). Alternatively, the location server may determine the position of the UE 404 using the known network geometry.

Either the UE 404 or the respective base station 402 may determine the distance 410 ($d_k$, where k=1, 2, 3) between the UE 404 and the respective base station 402. Specifically, the distance 410-1 between the UE 404 and base station 402-1 is $d_1$, the distance 410-2 between the UE 404 and base station 402-2 is $d_2$, and the distance 410-3 between the UE 404 and base station 402-3 is $d_3$. In an aspect, determining the RTT of signals exchanged between the UE 404 and any base station 402 can be performed and converted to a distance 410 ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 404 and the base stations 402 are the same. However, such an assumption may not be true in practice.

Once each distance 410 is determined, the UE 404, a base station 402, or the location server (e.g., location server 230, LMF 270) can solve for the position (x, y) of the UE 404 by using a variety of known geometric techniques, such as, for example, trilateration. From FIG. 4, it can be seen that the position of the UE 404 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 404 from the location of a base station 402). The intersection of the two directions at or near the point (x, y) can provide another estimate of the location for the UE 404.

A position estimate (e.g., for a UE 404) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
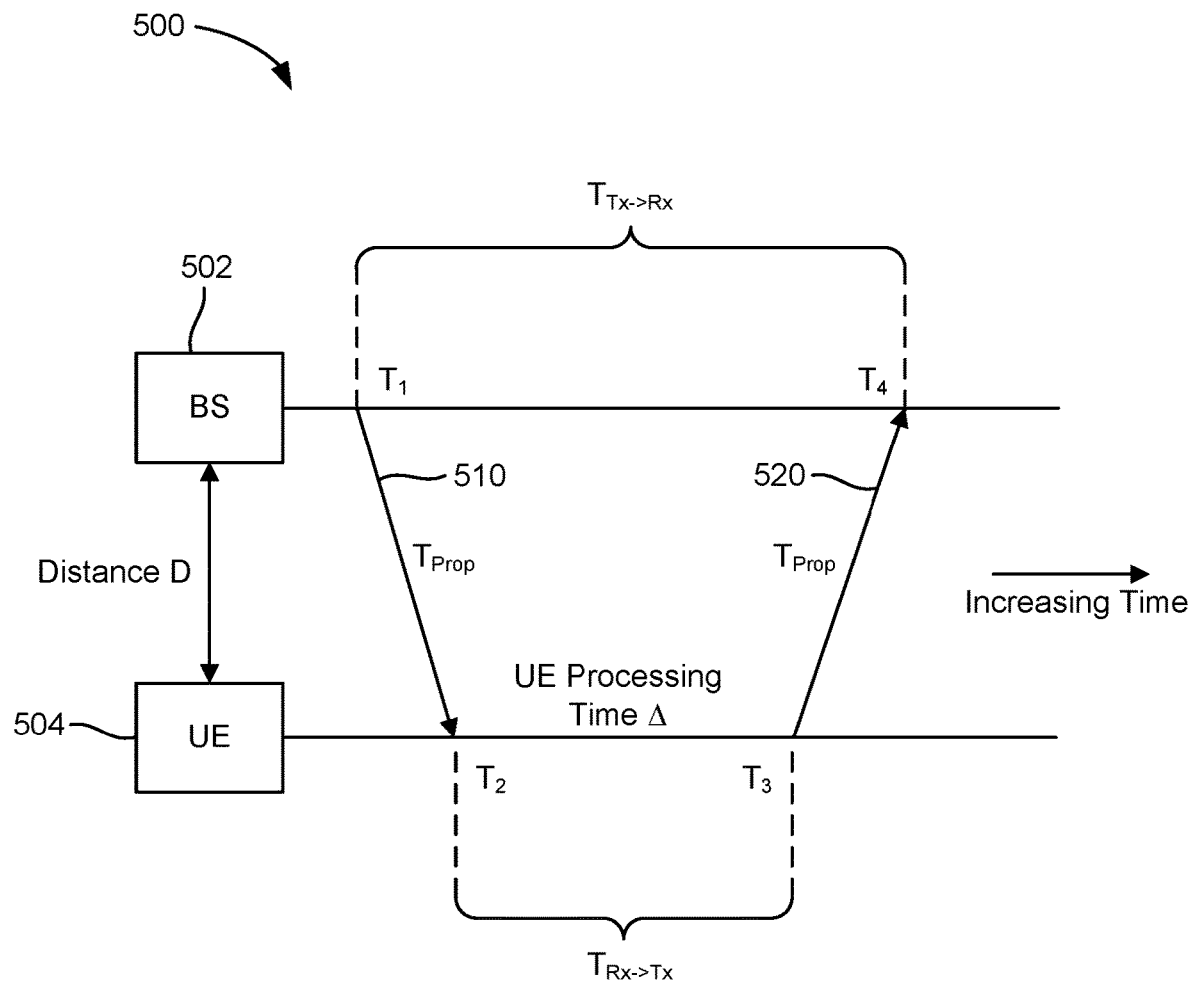
FIG. 5 illustrates a diagram of exemplary timings for determining an RTT between a serving transmission reception point (TRP) and a UE in accordance with one or more aspects of the disclosure.

FIG. 5 is an exemplary diagram 500 showing exemplary timings of RTT measurement signals exchanged between a TRP 502 (e.g., any of the base stations, gNBs, cells, etc. described herein) and a UE 504 (e.g., any of the UEs described herein), according to aspects of the disclosure. In the example of FIG. 5, the TRP 502 sends an RTT measurement signal 510 (e.g., PRS, NRS, CRS, CSI-RS, etc.) to the UE 504 at time $T_1$. The RTT measurement signal 510 has some propagation delay $T_{Prop}$ as it travels from the TRP 502 to the UE 504. At time $T_2$ (the ToA of the RTT measurement signal 510 at the UE 504), the UE 504 receives/measures the RTT measurement signal 510. After some UE processing time, the UE 504 transmits an RTT response signal 520 (e.g., an SRS, UL-PRS) at time $T_3$. After the propagation delay $T_{Prop}$, the TRP 502 receives/measures the RTT response signal 520 from the UE 504 at time $T_4$ (the ToA of the RTT response signal 520 at the TRP 502).

In order to identify the ToA (e.g., $T_2$) of an RF signal (e.g., an RTT measurement signal 510) transmitted by a given network node, the receiver (e.g., UE 504) first jointly processes all the resource elements (REs) on the channel on which the transmitter (e.g., TRP 502) is transmitting the RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the UE 504 may chose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

The RTT response signal 520 may explicitly include the difference between time $T_3$ and time $T_2$ (i.e., $T_{Rx \to Tx}$). Alternatively, it may be derived from the timing advance (TA), i.e., the relative UL/DL frame timing and specification location of UL reference signals. (Note that the TA is usually the RTT between the TRP 502 and the UE 504, or double the propagation time in one direction.) Using this measurement and the difference between time $T_4$ and time $T_1$ (i.e., $T_{Tx \to Rx}$), the TRP 502 can calculate the distance to the UE 504 as:

$$d = \frac{1}{2c}(T_{Tx \to Rx} - T_{Rx \to Tx}) = \frac{1}{2c}(T_2 - T_1) + \frac{1}{2c}(T_4 - T_3) \quad (1)$$

where c is the speed of light.

Note that the UE 504 can perform an RTT procedure with multiple TRPs 502. However, the RTT procedure does not require synchronization between these base stations 502. In the multi-RTT positioning procedure, the basic procedure is repeatedly performed between the UE and multiple TRPs (e.g., base stations gNBs, eNBs, cells, etc.). The basic procedure is as follows:
 1. gNB transmits downlink (DL) reference signal (RS) at time $T_1$ (also referred to as $T_{gNB,Tx}$);
 2. DL RS arrives at the UE at time $T_2$ (also referred to as $T_{UE,Rx}$);
 3. UE transmits uplink (UL) RS at time $T_3$ (also referred to as $T_{UE,Tx}$);
 4. UL RS arrives at the gNB at time $T_4$ (also referred to as $T_{gNB,Rx}$).

Positioning reference signal (PRS) is an example of the DL RS and sounding reference signal (SRS) is an example of the UL RS. With the knowledge of $(T_4-T_1)$ and $(T_3-T_2)$, the following equation may be generated:

$$RTT = \frac{2d}{c} = (T_4 - T_1) - (T_3 - T_2) = (T_4 - T_1) + (T_2 - T_3). \quad (2)$$

In conventional wireless networks (e.g., LTE), an E-CID (Enhanced Cell-ID) procedure is defined to determine the UE position. In this procedure, the UE measures its surroundings and provides measurement reports to the network. One measurement report may include measurements results for up to 32 TRPs. For a measured TRP, the measurement results includes:
 $UE_{Rx-Tx}$;
 cell ID;
 RSRP/RSRQ (reference signal received power/reference signal received quality) for the DL measurement (RRM measurements if available);
 SFN (system frame number) of the frame of that cell in which the UE considers the DL measurement to be valid.

The parameter $UE_{Rx-Tx}$ (referred to as "ue-RxTxTimeDiff" in LTE) is defined as $T_{UE,Rx}-T_{UE,Tx}$ in which $T_{UE,Rx}$ is the UE received timing of a downlink (DL) radio frame from the serving cell, and $T_{UE,Tx}$ is the UE transmit time of corresponding uplink (UL) radio frame to the serving TRP. Even though up to 32 TRPs can be measured, the ue-RxTxTimeDiff is provided only for the UE's primary TRP in conventional systems.

Figure 6:
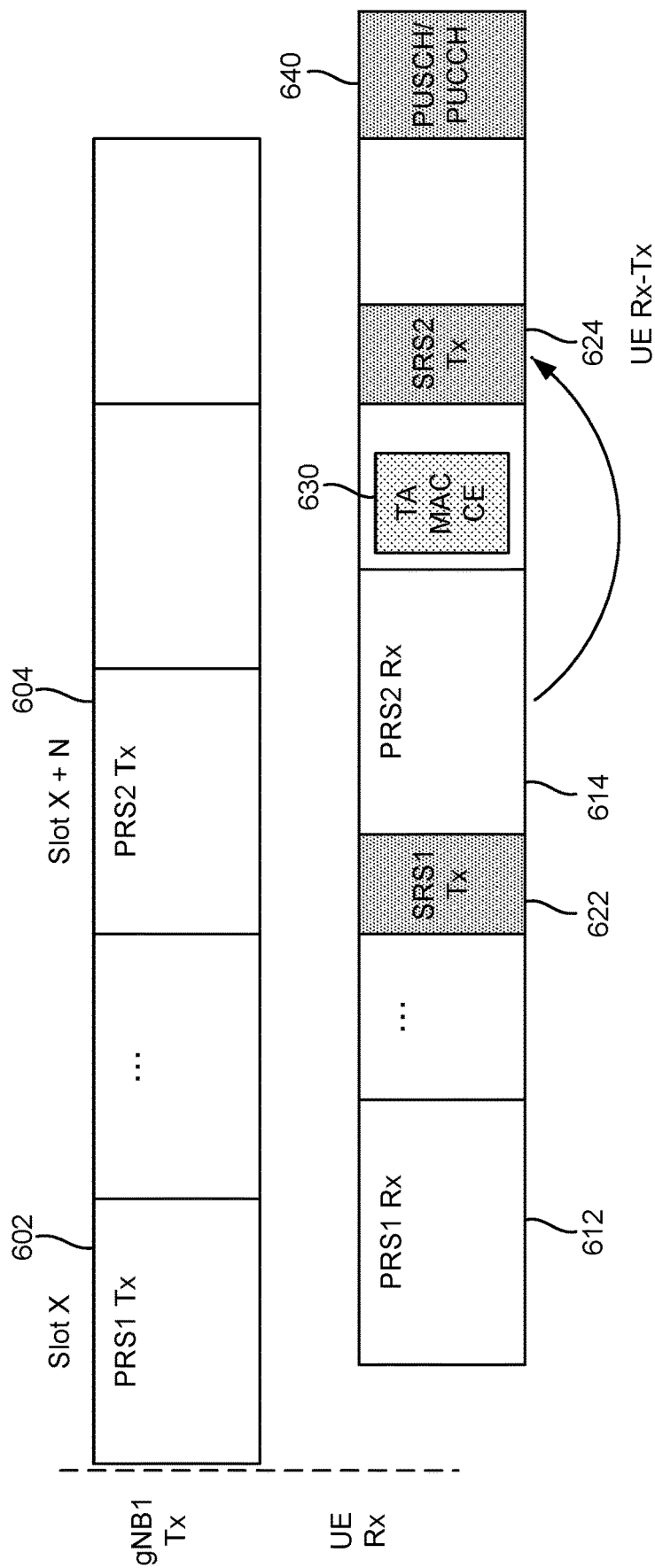
FIG. 6 illustrates a scenario in which a UE receives a timing advance command in between sounding reference signal (SRS) transmissions in accordance with an aspect of the disclosure.

With reference to FIG. 6, Assume the following scenario:
 UE is configured to receive multiple PRSs (positioning reference signals) from a TRP (e.g., gNB) inside a frame index;
 UE is configured to transmit multiple SRSs (sounding reference signals) inside the same frame;
 UE receives a timing advance (TA) command (as a MAC (media access control) CE (control element) command) which changes the UL transmission timing between the SRS transmissions.

In FIG. 6, it is assumed that gNB1 is a serving TRP to the UE. The gNB1 configures a frame (identifiable with SFN) and transmits the frame to the UE, and the frame is received at the UE after some propagation delay. The frame comprises a number of slots. As an aside, LTE supports a single numerology (subcarrier spacing (15 kHz) and symbol length). In contrast 5G NR may support multiple numerologies, for example, subcarrier spacings of 15 kHz, 30 kHz, 60 kHz, 120 kHz and 240 kHz or greater may be available. Table 1 provided below lists some various parameters for different 5G NR numerologies.

TABLE 1

| Subcarrier spacing (kHz) | Symbols/ slot | slots/ subframe | slots/frame | slot (ms) | Symbol duration (μsec) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

Thus, in 5G NR, the number of slots in a frame depends on the numerology of the radio frame structure being used. In FIG. 6, the gNB1 transmits a number of PRSs (e.g., PRS1 602, PRS2 604, . . . ) at specified slots/subframes of the frame. In the illustrated example, the slot and subframe can be considered to be the same for simplicity. However, it will be appreciated that this may vary based on the numerology as detailed in Table 1 above. The PRSs (e.g., PRS1 612, PRS2 614, . . . ) are received at the UE after some propagation delay. The gNB1 also configures the frame such that the UE can transmit the corresponding SRSs (e.g., SRS1 622, SRS2 624, . . . ) at a given slots/subframes of the frame. The frame is also configured with an uplink communication channel 640 (e.g., PUSCH and/or PUCCH) that can be used by the UE for measurement reporting including reporting the value of $UE_{Rx-Tx}$.

Technically, the $UE_{Rx-Tx}$ value should reflect the difference in time between the reception of a PRS and the transmission of a corresponding SRS (e.g., PRS1 612→SRS1 622, PRS2 614→SRS2 624). However, there may be intervening actions that impact this timing. For example, in FIG. 6, the gNB1 may issue a TA command 630, which is received by the UE between the reception of PRS2 614 and the transmission of SRS2 624. Thus, if the UE applies the timing advance to all UL transmissions subsequent to the TA command 630, the result will be that the PRS2 612→SRS2 622 time is likely different from the PRS1 614→SRS1 624 time.

In the foregoing situation, there may be ambiguity on what the UE will report as '$UE_{Rx-Tx}$' if the TA command 630 arrives between a PRS reception and an SRS transmission for the report. According to LTE, the TA command is NOT expected to be received. That is, in LTE UL E-CID positioning, it is assumed that no TA command is expected to be received between the PRS reception, SRS and the report. Simply put, LTE simply does NOT envision that the scenario in FIG. 6 can occur.

Figure 7:
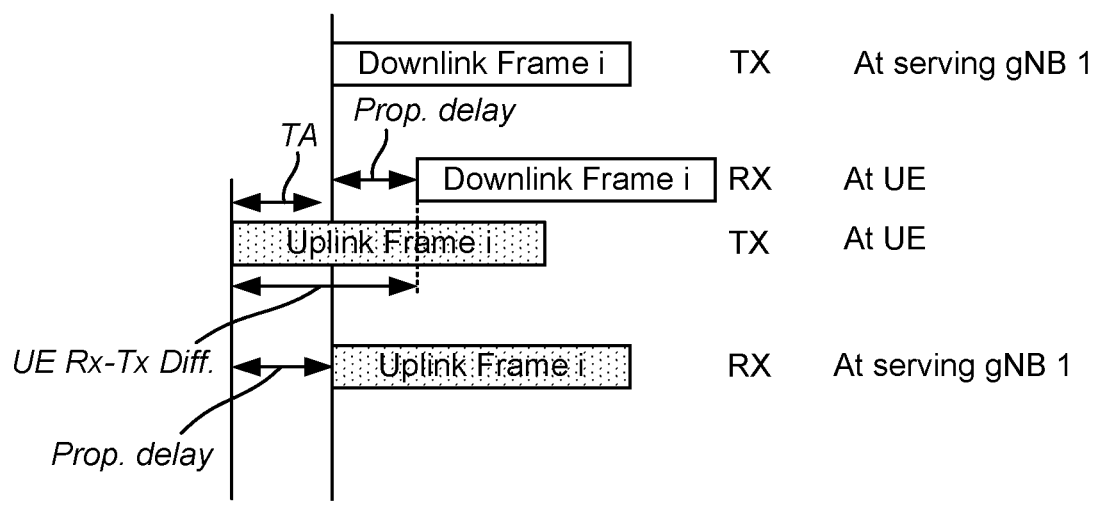
FIG. 7 illustrates an example effect of a UE applying a timing advance as commanded by a base station.

However, the LTE solution of ignoring a potential TA command in reporting is likely to be too constraining for scenarios of UEs with high mobility, or when the SRS is used for communication purposes in 5G NR and multi-RTT positioning. FIG. 7 illustrates an example effect of applying the TA command. The serving TRP (e.g., gNB1) transmits a DL frame (SFN i), which reaches the UE after some propagation delay. The UE transmits a corresponding UL frame (SFN i), which arrives at the gNB1 after the propagation delay. However, the UE advances the transmission of the UL frame so that at the gNB1, the DL frame and the UL frame are aligned.

As implied above, it would be desirable to allow the TA command to be sent at any time (e.g., at each slot/subframe). However, with existing techniques (e.g., LTE), this is not allowed. Moreover, the granularity of the report is limited in conventional techniques. As seen in FIG. 7, the $UE_{Rx-Tx}$ value that the UE actually reports to the gNB is the difference between a transmission start of a UL frame (frame i) at the UE and a reception start of corresponding DL frame (frame i) at the UE. The gNB1 can derive the actual $UE_{Rx-Tx}$ since it configures the resources of the frames (e.g. slots allocated for PRSs, SRSs). Simply put, in conventional techniques, the granularity of the $UE_{Rx-Tx}$ is limited to the frame level. This may be acceptable if high precision in location determination is not required (e.g., 50 meters or more).

In one or more aspects, to allow the TA command to be issued at any time, e.g., at any given slot/subframe, the UE is allowed to report the $UE_{Rx-Tx}$ value at a finer granularity than in the conventional techniques. Utilizing the various aspects disclosed, very high location precision (e.g., within 1 meter or less) can be achieved. Therefore, to address some or all of the shortcomings of the conventional techniques, the various aspects disclosed include the following options:

Option 1: The time-stamp of each $UE_{Rx-Tx}$ measurement is on the slot/subframe level with respect to the reference TRP (or serving TRP), meaning that there is one slot ID or subframe ID associated with the reported measurement;

Option 2: The time-stamp of each $UE_{Rx-Tx}$ measurement is configured so the UE reports a tuple of information (e.g., slot/subframe ID of when PRS is received, slot/subframe ID of when SRS is transmitted);

Option 3: The reported $UE_{Rx-Tx}$ refers to the latest/earliest measurement inside the reported frame;

Option 4:
The UE does not apply the TA command in the SRS used only for positioning, but applies the TA command for the remaining UL channels In this case, the SRS used for positioning would likely have gaps with the UL channels in adjacent symbols;
If the SRS is used for both positioning and communications, then the UE is expected to apply the TA command according to the serving TRP.

Each of the options will be described in detail. As discussed in the foregoing, the existing measurement reporting techniques, the granularity is at the frame level. Also with the existing reporting techniques, only one $UE_{Rx-Tx}$ is reported per system frame. However, referring back to FIG. 6, note that the gNB1 can transmit multiple PRSs within a single frame, and the UE responds with the corresponding SRS transmissions. That is, each reception of the PRS may trigger the SRS transmission at the UE. For example, reception of PRS1—i.e., PRS1 Rx—triggers the transmission of SRS1—i.e., SRS1 Tx.

The UE provides its measurement report in an uplink communication channel—e.g., the physical uplink shared channel (PUSCH) and/or the physical uplink control channel (PUCCH). In an aspect, it is proposed that the $UE_{Rx-Tx}$ value included in the measurement report have a granularity that is at least at the slot/subframe level. This corresponds to option 1 above. As an example, in FIG. 6, if the UE reports the PRS1→SRS1 duration as the $UE_{Rx-Tx}$, then the UE can report the $UE_{Rx-Tx}$ as a number of slots/subframes (or equivalent thereof) between the reception of the PRS1 and the transmission of the SRS1. For example, if the PRS1 is received at slot 3 of the frame and the SRS1 is transmitted at slot 7, then the $UE_{Rx-Tx}$ measurement would be 4 slots (or an equivalent thereof, e.g., 4, 2, or 1 subframes depending on the numerology). Note that being able to provide the $UE_{Rx-Tx}$ measurement on the slot/subframe level can significantly enhance positioning accuracy, since subframes have ten times the accuracy as frames and slots can be at a higher accuracy, especially when a wide bandwidth numerology is used (such as 240 kHz subspacing).

Note that in FIG. 6, the gNB1 can transmit multiple PRSs within one frame, and thus, the UE can also transmit multiple SRSs within the corresponding frame as well. Therefore, in an aspect, it is also proposed that the measurement report for a frame include multiple $UE_{Rx-Tx}$ measurements, for example, one for each PRS→SRS pair. With such capability, the UE is able to handle a TA command arrival in between a PRS reception and an SRS transmission. The UE would include both the PRS1→SRS1 duration and the PRS2→SRS2 duration as $UE_{Rx-Tx}$ measurements. In this way, the arrival of the TA command in between the reception of the PRS2 and the transmission of the SRS2 would not present a problem regardless of whether or not the UE applies the TA command for the SRS2 transmission.

In option 2, instead of just reporting each $UE_{Rx-Tx}$ measurement as a number of slots/subframes, it is proposed to report each $UE_{Rx-Tx}$ measurement as a tuple (PRS reception slot/subframe ID, SRS transmission slot/subframe ID). Then for the PRS1→SRS1 example above, instead of specifying 5 slots, the each $UE_{Rx-Tx}$ measurement would specify (slot 3, slot 7) in option 2. Similar tuples would be specified in the $UE_{Rx-Tx}$ measurement for each PRS→SRS pair. Like option 1, the arrival of the TA command would not present problems.

Figure 8:
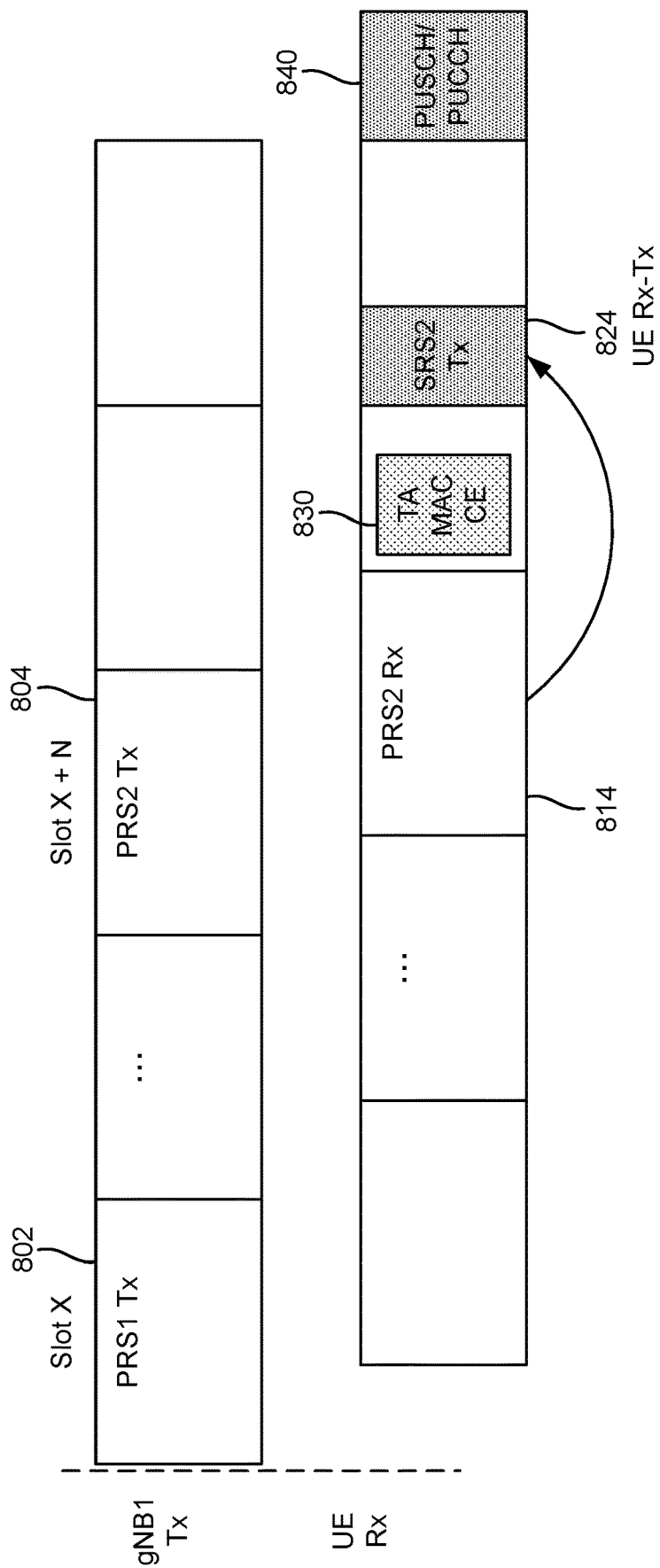
FIG. 8 illustrates another scenario in which a UE receives a timing advance command in between sounding reference signal (SRS) transmissions in accordance with an aspect of the disclosure.

FIG. 8 illustrates a scenario in which option 2 may be more favorable over option 1. In FIG. 8, the gNB1 transmits PRS1 802 at slot X and transmits PRS2 804 in slot/subframe X+N. However, the UE does not detect PRS1 (e.g., due to interference), so it does not send the corresponding SRS1. However, the UE does detect PRS2 814, and therefore, sends the corresponding SRS2 824. A TA command 830 is received between the PRS2 814 and the SRS2 824. The frame is also configured with an uplink communication channel 840 (e.g., PUSCH and/or PUCCH) that can be used by the UE for measurement reporting including reporting the value of $UE_{Rx-Tx}$. If option 1 is used, then the UE would include as the $UE_{Rx-Tx}$ measurement for the PRS2→SRS2 as some number of slots/subframes in the measurement report. Unfortunately, when the gNB1 receives the measurement report, it would not know whether the trigger for the $UE_{Rx-Tx}$ measurement was PRS1 or PRS2. However, under option 2, since the tuple is reported as the $UE_{Rx-Tx}$ measurement, the scenario in FIG. 8 would not present a problem, as gNB1 could identify which PRS was being responded to.

Option 3 may be less complex than either option 1 or 2. In option 3, only one $UE_{Rx-Tx}$ measurement is included in the measurement report, but again at the slot/subframe level of granurality. Referring back to FIG. 6, either the duration of the first PRS→SRS pair in the frame would be reported or the duration of the last PRS→SRS pair in the frame would be reported. The UE may be preconfigured to report the first/last, and the gNB may specify to the UE.

Unlike options 1, 2, and 3, option 4 includes determining under what circumstances under which the UE will apply the TA command when the TA command is received between a PRS reception and an SRS transmission. In an aspect, if the SRS is for positioning purposes only, the UE does not apply the timing advance for the SRS. That is, the transmission of the SRS is not advanced in accordance with the TA command. However, the UE does apply the timing advance for other remaining UL channels (e.g., PUSCH, PUCCH).

However, if the SRS is used for communication purposes, then the UE does apply the timing advance for the SRS as well as for the other UL channels regardless of whether or not the SRS is also used for positioning purposes. For example, the gNB1 may request the measurement report to determine what modulation and coding scheme (MCS) to use in the UL and DL channels to exchange data with the UE. As another example, the gNB1 may request the measurement report to determine/adjust the timing advance to be applied by the UE so that the UL channels from the UE are aligned with the UL channels from other UEs. As yet another example, the gNB1 may use the measurement report to decide what numerology to use when communicating with the UE.

Figure 9:
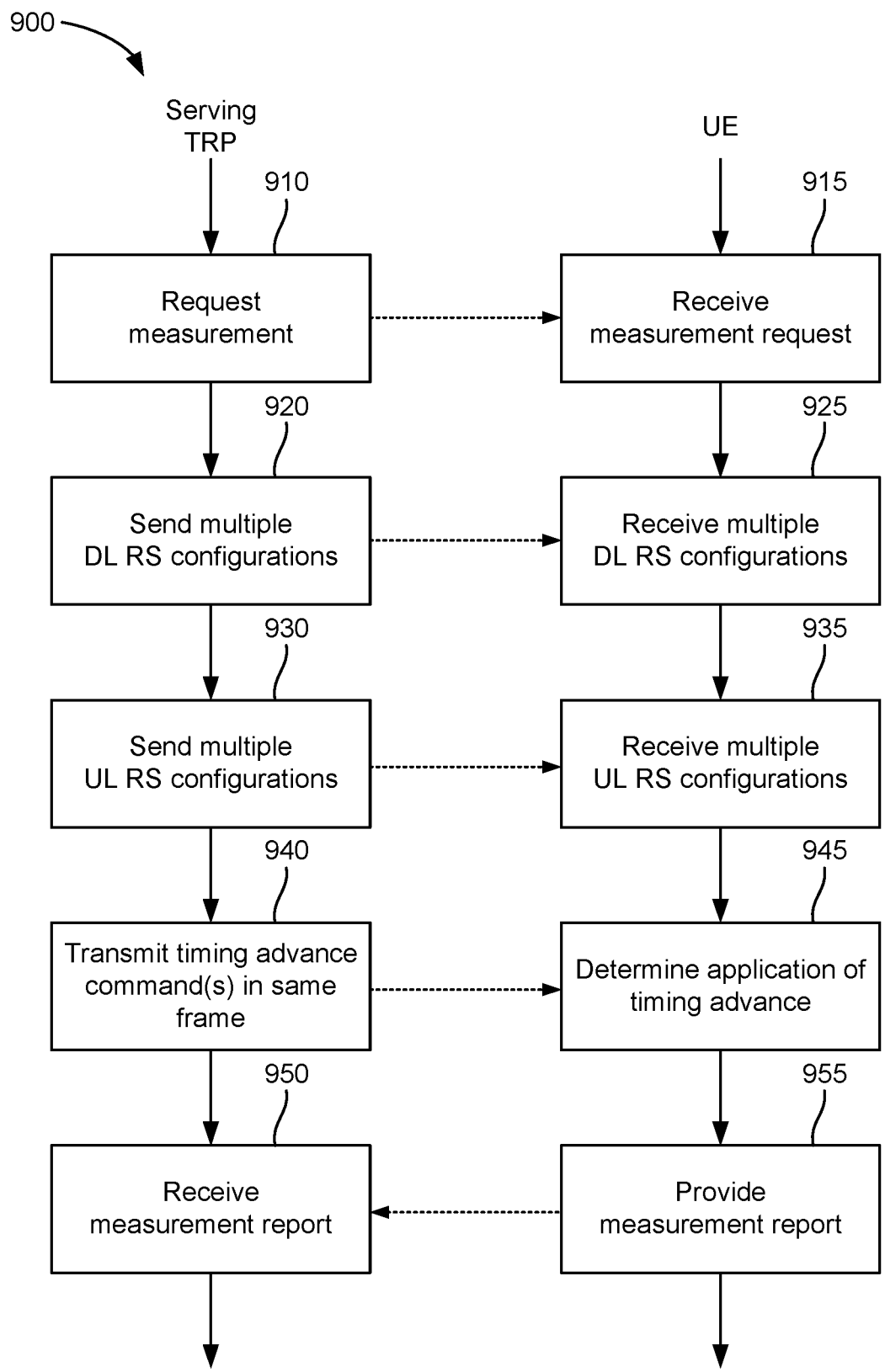
FIG. 9 illustrates an exemplary method performed by a serving TRP and a UE for measurement reporting in accordance with an aspect of the disclosure.

FIG. 9 illustrates an exemplary method performed by a serving TRP and a UE for providing measurement reports from the UE to the serving TRP. In FIG. 9, the dashed arrows indicate directions of communications between the serving TRP (e.g., base station, gNB, eNB, etc.) and the UE. At 910, the serving TRP (e.g., cell, base station, gNB, eNB, etc.) sends a measurement request to the UE, which is received by the UE at 915.

At 920, the serving TRP transmits a plurality of downlink reference signal (DL RS) configurations corresponding to reference signals transmitted by the serving TRP and/or neighboring TRPs in a frame, which are received by the UE at 925. At 930, the serving TRP transmits a plurality of uplink reference signal (UL RS) configurations corresponding to a plurality of UL RSs to be transmitted by the UE towards the serving and/or the neighboring TRPs in the frame, which are received by the UE at 935. PRSs are examples of the DL RSs and/or SRSs are examples of the UL RSs.

In an aspect, the frame is identifiable, e.g., by a system frame number (SFN), and comprises a plurality of slots and subframes. The number of slots in the frame can depend on the numerology. Each DL RS is carried on a slot/subframe of the frame. Each UL RS is also carried on a slot/subframe of the frame.

At 940, the serving TRP transmits one or more timing advance (TA) commands in the same frame, which is received by the UE. Each TA command is carried on a slot of the frame. At 945, the UE receives the TA commands and determines the application of the timing advance.

Figure 10A:
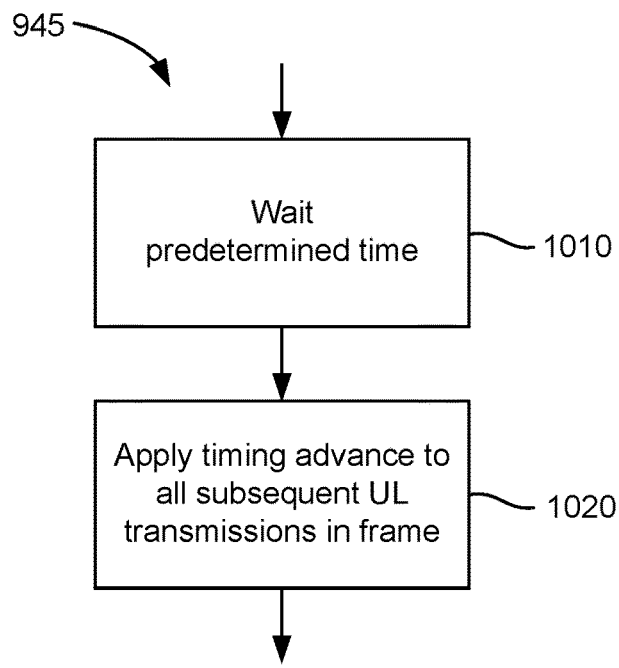
FIGS. 10A and 10B illustrate exemplary processes performed by the UE to apply timing advance.

FIG. 10A illustrates an exemplary process performed by the UE to implement block 945. At 1010, the UE waits a predetermined time (e.g., number of slots). After the predetermined wait time, at 1020, the UE applies the timing advance to all subsequent transmission in the frame. This includes the UL RSs (e.g., SRSs) regardless of whether or not the measurement request is for positioning only. Note that the predetermined time can be zero meaning that the timing advance is applied immediately.

Figure 10B:
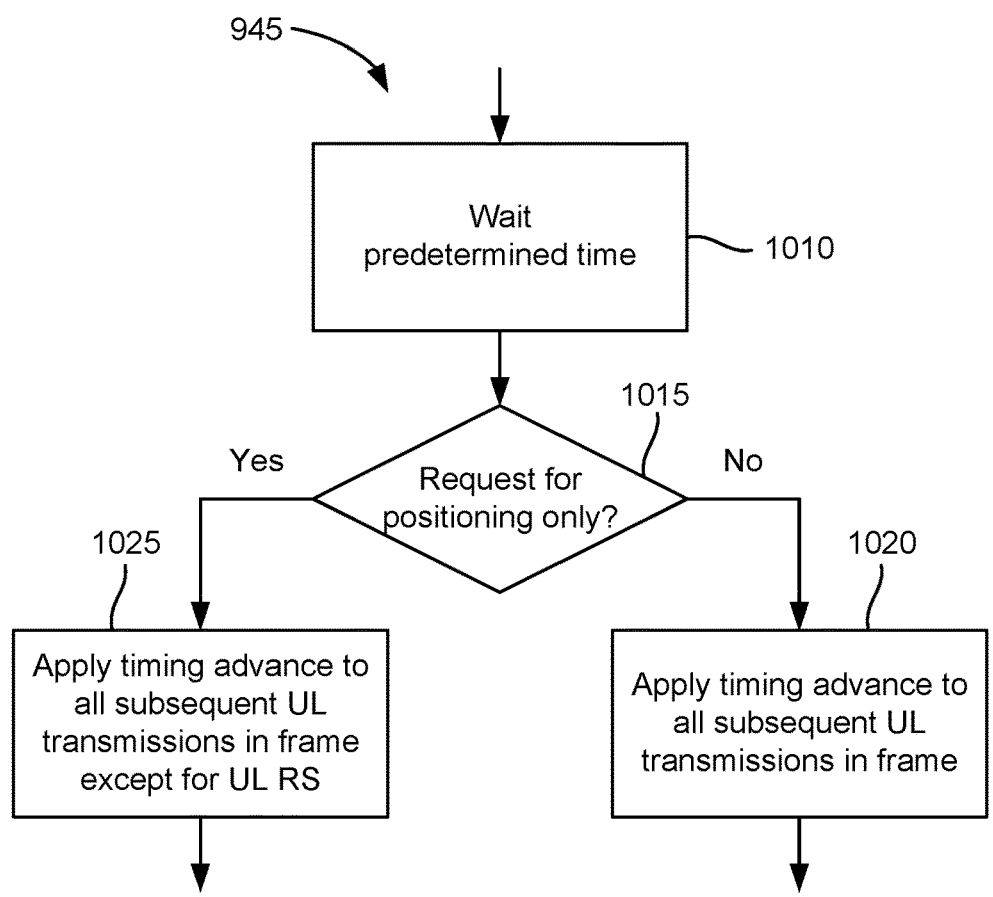

Alternatively, in FIG. 10B, whether or not to apply the timing advance can depend on whether the measurement request from the serving TRP is for determining positioning only or not. At 1010, the UE waits a predetermined time (e.g., number of slots). Again, the predetermined time can be zero. At 1015, the UE determines whether the measurement request is for positioning only. If it is not for positioning only (e.g., can also be for communication purposes), then at 1020, the UE applies the timing advance to all subsequent transmission in the frame including the UL RS transmissions. On the other hand, if the measurement is for positioning only, then at 1025, the UE applies the timing advance to all subsequent transmission in the frame except for the UL RSs. FIGS. 10A, 10B correspond to option 4 discussed above.

Referring back to FIG. 9, at 955, the UE provides, and at 950, the serving TRP receives a measurement report on the frame. In an aspect, the measurement report includes a system frame number (SFN) to identify frame associated with the measurement report. The measurement report also includes one or more $UE_{Rx-Tx}$ measurements, which will also be referred to as "UE RTT related measurements" since these measurements are measured by the UE and are useful in determining the RTT between the serving TRP and the UE, and hence, useful for determining the position of the UE. Each UE RTT related measurement represents a duration between the UE receiving the DL RS (e.g., PRS) from the serving TRP and the UE transmitting the corresponding UL RS (e.g., SRS) to the serving TRP. Also, the granularity of each UE RTT related measurement is at a slot/subframe level (e.g., as a number of slots/subframes or some equivalent thereof).

In the simplest case, the measurement report includes one UE RTT related measurement (one $UE_{Rx-Tx}$ measurement). This corresponds to option 3 discussed above. This one measurement may reflect the measurement of the first DL RS→UL RS pair or the last DL RS→UL RS pair in the frame. That is, the UE RTT related measurement may represent a duration between a first DL RS in the frame and its corresponding UL RS or may represent a duration between a last DL RS in the frame and its corresponding UL RS.

More generally, the measurement report can include any number of UE RTT related measurements (one or more $UE_{Rx-Tx}$ measurements). In one aspect, each UE RTT related measurement may be reported a number of slots between the reception of the DL RS and the transmission of the corresponding UL RS. This corresponds to option 1 discussed above.

In another aspect, each UE RTT related measurement may be reported as a tuple comprising a slot/subframe ID of the reception of the DL RS and a slot/subframe ID of the transmission of the corresponding UL RS. This corresponds to option 2 discussed above.

Figure 11:
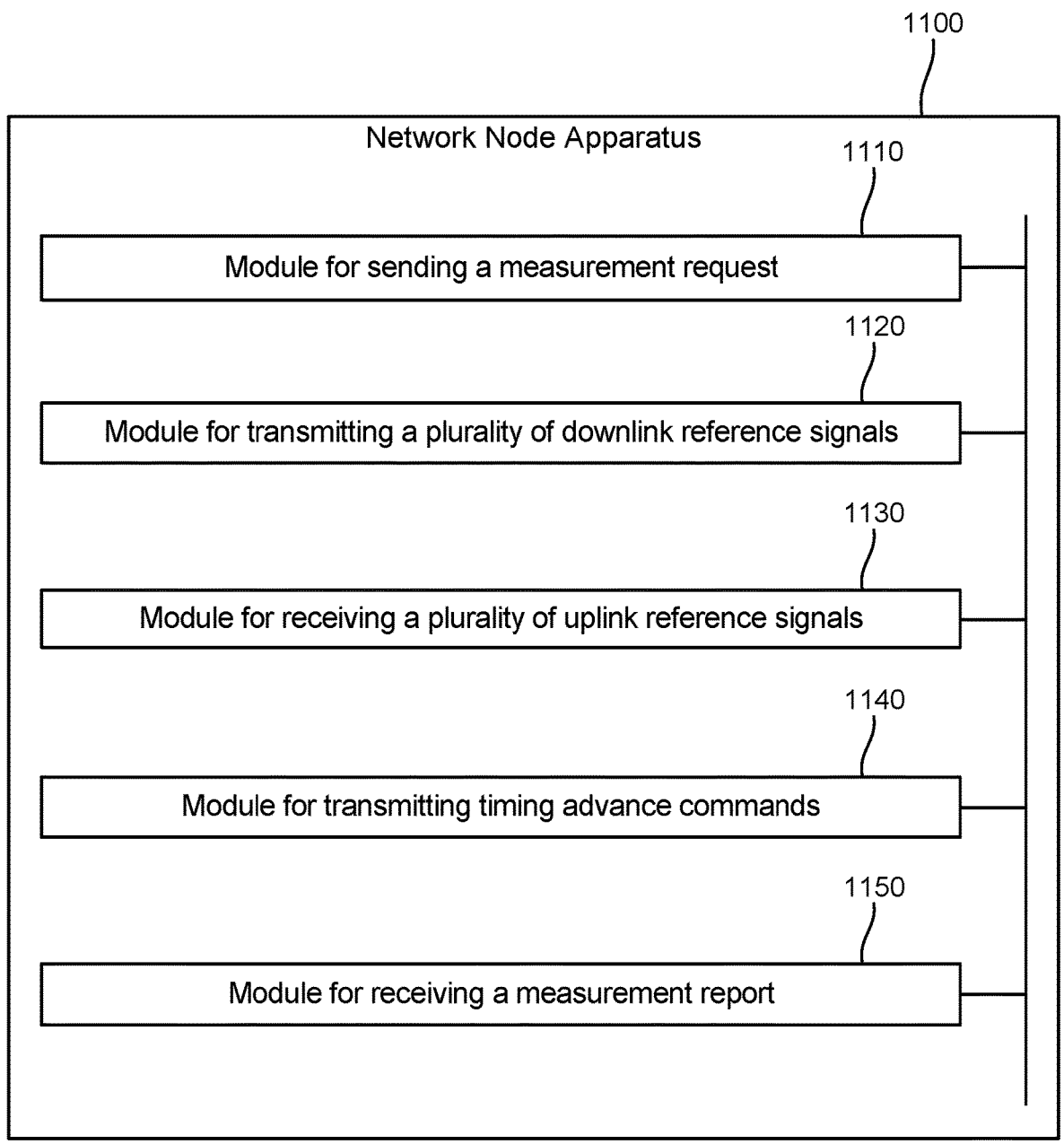
FIGS. 11 and 12 are other simplified block diagrams of several sample aspects of apparatuses configured to support positioning and communication as taught herein.

FIG. 11 illustrates an example network node apparatus 1100, which can serve as a serving TRP, represented as a series of interrelated functional modules connected by a common bus. Each of the modules may be implemented in hardware or as a combination of hardware and software. For example, the modules may be implemented as any combination of the apparatus 304. A module for sending a measurement request 1110 may correspond at least in some aspects to, for example, a communication device, such as transceiver 350 in FIG. 3B and/or a processing system, such as processing system 384 in FIG. 3B, as discussed herein. A module for transmitting a plurality of reference signals 1120 may correspond at least in some aspects to, for example, a communication device, such as transceiver 350 in FIG. 3B and/or a processing system, such as processing system 384 in FIG. 3B, as discussed herein. A module for receiving a plurality of uplink reference signals 1130 may correspond at least in some aspects to, for example, a communication device, such as transceiver 350 in FIG. 3B and/or a processing system, such as processing system 384 in FIG. 3B, as discussed herein. A module for transmitting timing advance commands 1140 may correspond at least in some aspects to, for example, a communication device, such as transceiver 350 in FIG. 3B and/or a processing system, such as processing system 384 in FIG. 3B 3, as discussed herein. A module for receiving a measurement report 1150 may correspond at least in some aspects to, for example, a communication device, such as transceiver 350 in FIG. 3B and/or a processing system, such as processing system 384 in FIG. 3B, as discussed herein.

Figure 12:
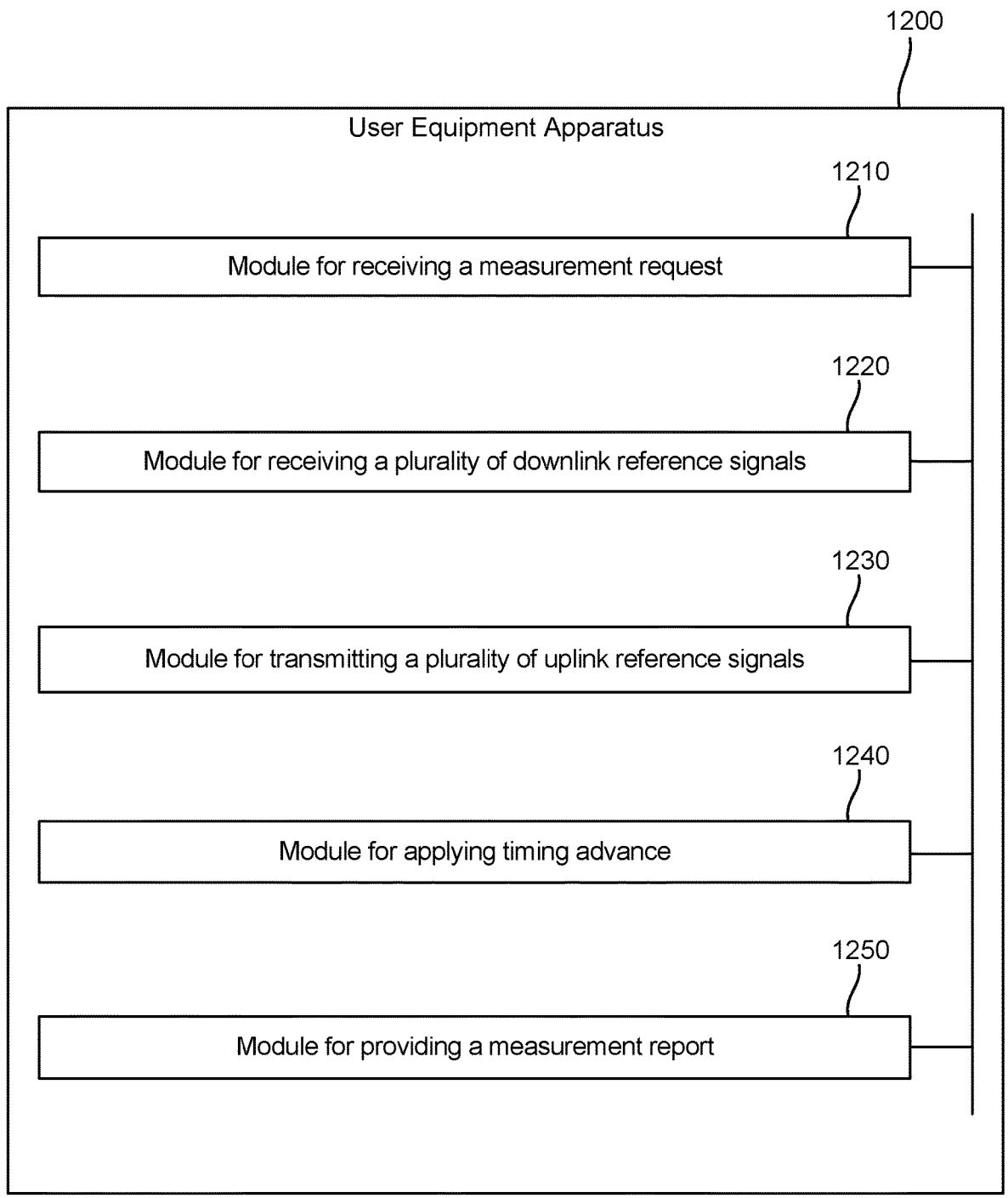

FIG. 12 illustrates an example user equipment apparatus (UE) 1200 represented as a series of interrelated functional modules connected by a common bus. Each of the modules may be implemented in hardware or as a combination of hardware and software. For example, the modules may be implemented as any combination of the apparatus 302. A module for receiving a measurement request 1210 may correspond at least in some aspects to, for example, a communication device, such as transceiver 310 in FIG. 3A and/or a processing system, such as processing system 332 in FIG. 3A, as discussed herein. A module for receiving a plurality of reference signals 1220 may correspond at least in some aspects to, for example, a communication device, such as transceiver 310 in FIG. 3A and/or a processing system, such as processing system 332 in FIG. 3A, as discussed herein. A module for transmitting a plurality of uplink reference signals 1230 may correspond at least in some aspects to, for example, a communication device, such as transceiver 310 in FIG. 3A and/or a processing system, such as processing system 332 in FIG. 3A, as discussed herein. A module for applying timing advance 1240 may correspond at least in some aspects to, for example, a communication device, such as transceiver 310 in FIG. 3A and/or a processing system, such as processing system 332 in FIG. 3A, as discussed herein. A module for transmitting a measurement report 1250 may correspond at least in some aspects to, for example, a communication device, such as such as transceiver 310 in FIG. 3A and/or a processing system, such as processing system 332 in FIG. 3A, as discussed herein.

The functionality of the modules of FIGS. 11-12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 11-12, as well as other components and functions described herein, may be implemented using any suitable means. Such means also may be implemented, at least in part, using corresponding structure as taught herein. For example, the components described above in conjunction with the "module for" components of FIGS. 11-12 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a network entity, comprising:
   sending, to a user equipment (UE), a downlink reference signal (DL RS) configuration for one or more DL RS resources transmitted by at least one transmission reception point (TRP) in a frame; and
   receiving a measurement report from the UE, wherein the measurement report includes:
   one or more UE receive-to-transmit (Rx-Tx) time difference measurements, each of the one or more UE Rx-Tx time difference measurements representing a time difference between a reception time at the UE during the frame of the one or more DL RS resources and an uplink transmit timing for the UE during the frame, and
   a timestamp for each of the one or more UE Rx-Tx time difference measurements, wherein each timestamp is a system frame number (SFN), a subframe identifier (ID), a slot ID, or any combination thereof.

2. The method of claim 1, wherein each of the one or more UE Rx-Tx time difference measurements is associated with a tuple of slot IDs of the frame comprising a slot ID of a slot of the frame including the reception time of the one or more DL RS resources and a slot ID of a slot of the frame including transmission of one or more uplink reference signal (UL RS) resources transmitted by the UE during the frame.

3. The method of claim 2, wherein the uplink transmit timing for the UE is based on transmission by the UE of the one or more UL RS resources.

4. The method of claim 2, wherein the one or more DL RS resources are one or more positioning reference signal (PRS) resources, the one or more UL RS resources are one or more sounding reference signal (SRS) resources, or both.

5. The method of claim 1, wherein a granularity of each UE Rx-Tx time difference measurement of the one or more UE Rx-Tx time difference measurements is at a frame level, a subframe level, or a slot level.

6. The method of claim 5, wherein:
   the measurement report includes one UE Rx-Tx time difference measurement, and
   the one UE Rx-Tx time difference measurement corresponds to a last DL RS resource reception of the one or more DL RS resources in the frame.

7. The method of claim 1, wherein each UE Rx-Tx time difference measurement of the one or more UE Rx-Tx time difference measurements is associated with an SFN and a slot ID during which the UE Rx-Tx time difference measurement is expected to be valid.

8. The method of claim 1, further comprising:
   transmitting a measurement request to the UE, wherein the measurement report is received in response to the measurement request.

9. A method of wireless communication performed by a user equipment (UE), comprising:
   receiving, from a network entity, a downlink reference signal (DL RS) configuration for one or more DL RS resources transmitted by at least one transmission reception point (TRP) in a frame; and transmitting a measurement report to the network entity, wherein the measurement report includes:

one or more UE receive-to-transmit (Rx-Tx) time difference measurements, each of the one or more UE Rx-Tx time difference measurements representing a time difference between a reception time at the UE during the frame of the one or more DL RS resources and an uplink transmit timing for the UE during the frame, and a timestamp for each of the one or more UE Rx-Tx time difference measurements, wherein each timestamp is a system frame number (SFN), a subframe identifier (ID), a slot ID, or any combination thereof.

10. The method of claim 9, further comprising:
receiving, from a serving base station, an uplink reference signal (UL RS) configuration for one or more UL RS resources to be transmitted by the UE during the frame.

11. The method of claim 10, wherein each of the one or more UE Rx-Tx time difference measurements is associated with a tuple of slot IDs of the frame comprising a slot ID of a slot of the frame including the reception time of the one or more DL RS resources and a slot ID of a slot of the frame including transmission of the one or more UL RS resources.

12. The method of claim 10, wherein the uplink transmit timing for the UE is based on transmission of the one or more UL RS resources.

13. The method of claim 10, further comprising:
receiving, from the serving base station, at least one timing advance (TA) command between transmissions of two DL RS resources of the one or more DL RS resources, between receptions of two UL RS resources of the one or more UL RS resources, or both.

14. The method of claim 10, wherein the one or more DL RS resources are one or more positioning reference signal (PRS) resources, the one or more UL RS resources are one or more sounding reference signal (SRS) resources, or both.

15. The method of claim 9, further comprising:
receiving, from a serving base station, one or more timing advance (TA) commands during the frame, each TA command carried on a slot of the frame, wherein the one or more TA commands are included in media access control control elements (MAC-CEs).

16. The method of claim 9, further comprising:
receiving, from a serving base station, a timing advance (TA) command in a slot of the frame; and
applying the TA command to all subsequent uplink transmissions in the frame.

17. The method of claim 16, further comprising:
waiting a predetermined time prior to applying the TA command.

18. The method of claim 16, further comprising:
receiving a measurement request from the network entity;
determining whether the measurement request is for positioning only,
wherein the TA command is applied to all subsequent uplink transmissions in the frame based on a determination that the measurement request is not for positioning only, and
wherein the TA command is applied to all subsequent uplink transmissions in the frame except for SRS transmissions based on a determination that the measurement request is for positioning only.

19. The method of claim 9, wherein a granularity of each UE Rx-Tx time difference measurement of the one or more UE Rx-Tx time difference measurements is at a frame level, a subframe level, or a slot level.

20. The method of claim 9, wherein:
the measurement report includes one UE Rx-Tx time difference measurement, and
the one UE Rx-Tx time difference measurement corresponds to a last DL RS resource reception of the one or more DL RS resources in the frame.

21. The method of claim 9, wherein each UE Rx-Tx time difference measurement of the one or more UE Rx-Tx time difference measurements is associated with an SFN and a slot ID during which the UE Rx-Tx time difference measurement is expected to be valid.

22. The method of claim 9, further comprising:
receiving a measurement request from the network entity, wherein the measurement report is transmitted in response to the measurement request.

23. A network entity, comprising:
a memory;
at least one transceiver; and
at least one processor communicatively coupled to the memory and the at least one transceiver, the at least one processor configured to:
send, via the at least one transceiver, to a user equipment (UE), a downlink reference signal (DL RS) configuration for one or more DL RS resources transmitted by at least one transmission reception point (TRP) in a frame; and
receive, via the at least one transceiver, a measurement report from the UE, wherein the measurement report includes:
one or more UE receive-to-transmit (Rx-Tx) time difference measurements, each of the one or more UE Rx-Tx time difference measurements representing a time difference between a reception time at the UE during the frame of the one or more DL RS resources and an uplink transmit timing for the UE during the frame, and
a timestamp for each of the one or more UE Rx-Tx time difference measurements, wherein each timestamp is a system frame number (SFN), a subframe identifier (ID), a slot ID, or any combination thereof.

24. The network entity of claim 23, wherein each of the one or more UE Rx-Tx time difference measurements is associated with a tuple of slot IDs of the frame comprising a slot ID of a slot of the frame including the reception time of the one or more DL RS resources and a slot ID of a slot of the frame including transmission of one or more uplink reference signal (UL RS) resources transmitted by the UE during the frame.

25. The network entity of claim 24, wherein the uplink transmit timing for the UE is based on transmission by the UE of the one or more UL RS resources.

26. The network entity of claim 24, wherein the one or more DL RS resources are one or more positioning reference signal (PRS) resources, the one or more UL RS resources are one or more sounding reference signal (SRS) resources, or both.

27. The network entity of claim 23, wherein a granularity of each UE Rx-Tx time difference measurement of the one or more UE Rx-Tx time difference measurements is at a frame level, a subframe level, or a slot level.

28. The network entity of claim 27, wherein:
the measurement report includes one UE Rx-Tx time difference measurement, and
the one UE Rx-Tx time difference measurement corresponds to a last DL RS resource reception of the one or more DL RS resources in the frame.

29. The network entity of claim 23, wherein each UE Rx-Tx time difference measurement of the one or more UE Rx-Tx time difference measurements is associated with an SFN and a slot ID during which the UE Rx-Tx time difference measurement is expected to be valid.

30. The network entity of claim 23, wherein the at least one processor is further configured to:
transmit, via the at least one transceiver, a measurement request to the UE, wherein the measurement report is received in response to the measurement request.

31. A user equipment (UE), comprising:
a memory;
at least one transceiver; and
at least one processor communicatively coupled to the memory and the at least one transceiver, the at least one processor configured to:
receive, via the at least one transceiver, from a network entity, a downlink reference signal (DL RS) configuration for one or more DL RS resources transmitted by at least one transmission reception point (TRP) in a frame; and
transmit, via the at least one transceiver, a measurement report to the network entity, wherein the measurement report includes:
one or more UE receive-to-transmit (Rx-Tx) time difference measurements, each of the one or more UE Rx-Tx time difference measurements representing a time difference between a reception time at the UE during the frame of the one or more DL RS resources and an uplink transmit timing for the UE during the frame, and
a timestamp for each of the one or more UE Rx-Tx time difference measurements, wherein each timestamp is a system frame number (SFN), a subframe identifier (ID), a slot ID, or any combination thereof.

32. The UE of claim 31, wherein the at least one processor is further configured to:
receive, via the at least one transceiver, from a serving base station, an uplink reference signal (UL RS) configuration for one or more UL RS resources to be transmitted by the UE during the frame.

33. The UE of claim 32, wherein each of the one or more UE Rx-Tx time difference measurements is associated with a tuple of slot IDs of the frame comprising a slot ID of a slot of the frame including the reception time of the one or more DL RS resources and a slot ID of a slot of the frame including transmission of the one or more UL RS resources.

34. The UE of claim 32, wherein the uplink transmit timing for the UE is based on transmission of the one or more UL RS resources.

35. The UE of claim 32, wherein the at least one processor is further configured to:
receive, via the at least one transceiver, from the serving base station, at least one timing advance (TA) command between transmissions of two DL RS resources of the one or more DL RS resources, between receptions of two UL RS resources of the one or more UL RS resources, or both.

36. The UE of claim 32, wherein the one or more DL RS resources are one or more positioning reference signal (PRS) resources, the one or more UL RS resources are one or more sounding reference signal (SRS) resources, or both.

37. The UE of claim 31, wherein the at least one processor is further configured to:
receive, via the at least one transceiver, from a serving base station, one or more timing advance (TA) commands during the frame, each TA command carried on a slot of the frame, wherein the one or more TA commands are included in media access control control elements (MAC-CEs).

38. The UE of claim 31, wherein the at least one processor is further configured to:
receive, via the at least one transceiver, from a serving base station, a timing advance (TA) command in a slot of the frame; and
apply the TA command to all subsequent uplink transmissions in the frame.

39. The UE of claim 38, wherein the at least one processor is further configured to:
wait a predetermined time prior to applying the TA command.

40. The UE of claim 38, wherein the at least one processor is further configured to:
receive, via the at least one transceiver, a measurement request from the network entity;
determine whether the measurement request is for positioning only,
wherein the TA command is applied to all subsequent uplink transmissions in the frame based on a determination that the measurement request is not for positioning only, and
wherein the TA command is applied to all subsequent uplink transmissions in the frame except for SRS transmissions based on a determination that the measurement request is for positioning only.

41. The UE of claim 31, wherein a granularity of each UE Rx-Tx time difference measurement of the one or more UE Rx-Tx time difference measurements is at a frame level, a subframe level, or a slot level.

42. The UE of claim 31, wherein:
the measurement report includes one UE Rx-Tx time difference measurement, and
the one UE Rx-Tx time difference measurement corresponds to a last DL RS resource reception of the one or more DL RS resources in the frame.

43. The UE of claim 31, wherein each UE Rx-Tx time difference measurement of the one or more UE Rx-Tx time difference measurements is associated with an SFN and a slot ID during which the UE Rx-Tx time difference measurement is expected to be valid.

44. The UE of claim 31, wherein the at least one processor is further configured to:
receive, via the at least one transceiver, a measurement request from the network entity, wherein the measurement report is transmitted in response to the measurement request.

45. A network entity, comprising:
means for sending, to a user equipment (UE), a downlink reference signal (DL RS) configuration for one or more DL RS resources transmitted by at least one transmission reception point (TRP) in a frame; and
means for receiving a measurement report from the UE, wherein the measurement report includes:
one or more UE receive-to-transmit (Rx-Tx) time difference measurements, each of the one or more UE Rx-Tx time difference measurements representing a time difference between a reception time at the UE during the frame of the one or more DL RS resources and an uplink transmit timing for the UE during the frame, and
a timestamp for each of the one or more UE Rx-Tx time difference measurements, wherein each timestamp is a system frame number (SFN), a subframe identifier (ID), a slot ID, or any combination thereof.

46. The network entity of claim 45, wherein each UE Rx-Tx time difference measurement of the one or more UE Rx-Tx time difference measurements is associated with an SFN and a slot ID during which the UE Rx-Tx time difference measurement is expected to be valid.

47. A user equipment (UE), comprising:
means for receiving, from a network entity, a downlink reference signal (DL RS) configuration for one or more DL RS resources transmitted by at least one transmission reception point (TRP) in a frame; and
means for transmitting a measurement report to the network entity, wherein the measurement report includes:
one or more UE receive-to-transmit (Rx-Tx) time difference measurements, each of the one or more UE Rx-Tx time difference measurements representing a time difference between a reception time at the UE during the frame of the one or more DL RS resources and an uplink transmit timing for the UE during the frame, and
a timestamp for each of the one or more UE Rx-Tx time difference measurements, wherein each timestamp is a system frame number (SFN), a subframe identifier (ID), a slot ID, or any combination thereof.

48. The UE of claim 47, wherein each UE Rx-Tx time difference measurement of the one or more UE Rx-Tx time difference measurements is associated with an SFN and a slot ID during which the UE Rx-Tx time difference measurement is expected to be valid.

* * * * *